United States Patent
Murugesan et al.

(10) Patent No.: US 11,636,310 B2
(45) Date of Patent: Apr. 25, 2023

(54) BUILDING SYSTEM WITH SELECTIVE USE OF DATA FOR PROBABILISTIC FORECASTING

(71) Applicant: Johnson Controls Tyco IP Holdings LLP, Milwaukee, WI (US)

(72) Inventors: Sugumar Murugesan, Santa Clara, CA (US); Young M. Lee, Old Westbury, NY (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 822 days.

(21) Appl. No.: 16/549,656

(22) Filed: Aug. 23, 2019

(65) Prior Publication Data
US 2021/0056386 A1 Feb. 25, 2021

(51) Int. Cl.
*G08B 23/00* (2006.01)
*G06N 3/04* (2023.01)
(Continued)

(52) U.S. Cl.
CPC .......... *G06N 3/0445* (2013.01); *G06N 3/08* (2013.01); *G06Q 10/04* (2013.01)

(58) Field of Classification Search
CPC ...... G06N 3/0445; G06N 3/08; G06N 3/0454; G06Q 10/04; G06Q 50/06; G06Q 50/08; G06Q 50/163
(Continued)

(56) References Cited

U.S. PATENT DOCUMENTS 7,617,010 B2 * 11/2009 Bocharov ........... G06F 16/2465
703/2
9,447,985 B2 9/2016 Johnson
(Continued)

FOREIGN PATENT DOCUMENTS

CA 2957726 A1 3/2016
CA 3043996 A1 2/2018
(Continued)

OTHER PUBLICATIONS

CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).
(Continued)

*Primary Examiner* — Anh V La
(74) *Attorney, Agent, or Firm* — Foley & Lardner LLP

(57) ABSTRACT

A building system for generating input forecast data. The building system comprising one or more memory devices configured to store instructions thereon that, when executed by one or more processors, cause the one or more processors to retrieve a current prediction set of measurements comprising current values associated with a plurality of time-steps; identify time-steps of the plurality of time-steps for which historical prediction values of a historical prediction set of measurements are outside of a tolerance of corresponding historical actual values of a historical actual set of measurements; replace each current value of the current prediction set of measurements that is associated with the identified time-steps with a predetermined value to generate an updated prediction set of measurements; and provide the updated prediction set of measurements to a prediction model.

20 Claims, 11 Drawing Sheets

(51) Int. Cl.
*G06N 3/08* (2023.01)
*G06Q 10/04* (2023.01)

(58) Field of Classification Search
USPC .............. 706/21, 906, 907; 340/693.3, 693.1
See application file for complete search history.

(56) References Cited

U.S. PATENT DOCUMENTS

| | | | |
|---|---|---|---|
| 10,871,756 B2 | 12/2020 | Johnson et al. | |
| 10,908,578 B2 | 2/2021 | Johnson et al. | |
| 10,921,768 B2 | 2/2021 | Johnson et al. | |
| 11,156,978 B2 | 10/2021 | Johnson et al. | |
| 2011/0082597 A1* | 4/2011 | Meagher | H02J 3/38 700/291 |
| 2011/0153103 A1* | 6/2011 | Brown | H02J 13/00016 340/657 |
| 2015/0302318 A1* | 10/2015 | Chen | G06N 20/00 706/14 |
| 2017/0124458 A1* | 5/2017 | Jayaraman | G06N 5/02 |
| 2018/0375444 A1 | 12/2018 | Gamroth | |
| 2019/0369963 A1* | 12/2019 | Utsumi | G06Q 50/06 |
| 2021/0012263 A1* | 1/2021 | Li | G06Q 10/06393 |

FOREIGN PATENT DOCUMENTS

| | | | |
|---|---|---|---|
| EP | 3 186 687 A4 | 7/2017 | |
| EP | 3 497 377 A1 | 6/2019 | |

OTHER PUBLICATIONS

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Mosaic Christian Church a Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

(56) References Cited

OTHER PUBLICATIONS

Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
Olah, Christopher, "Understanding LSTM Networks," URL: http://colah.github.io/posts/2015-08-Understanding-LSTMs/, Aug. 27, 2015 (9 pages).

* cited by examiner

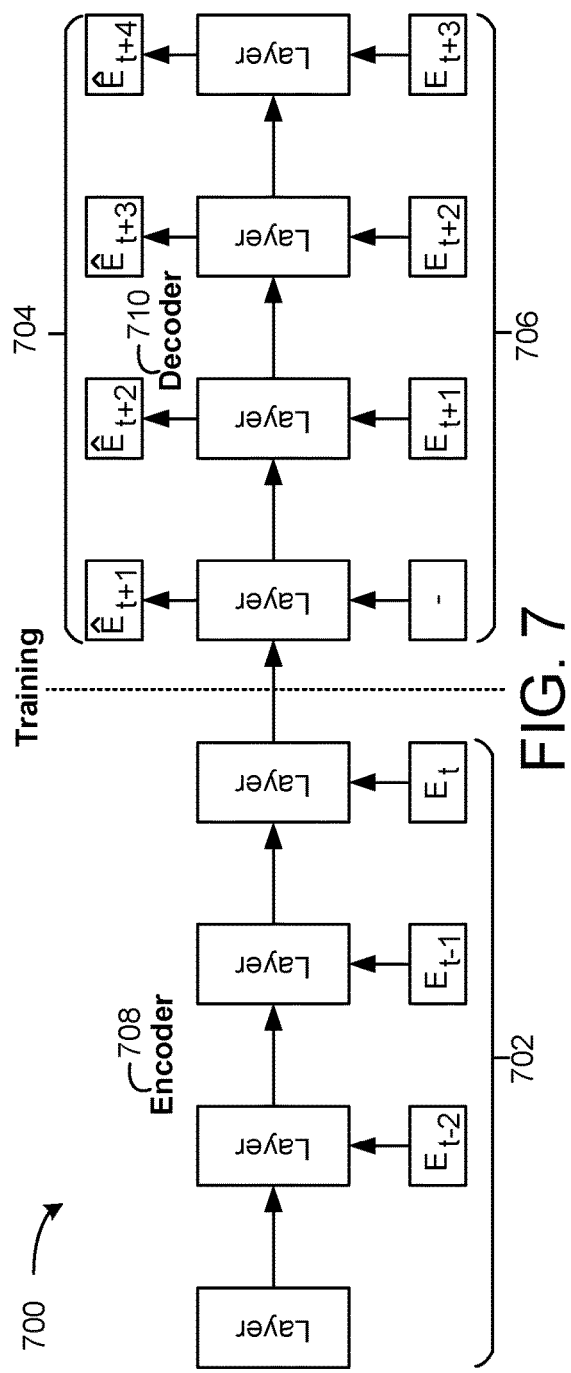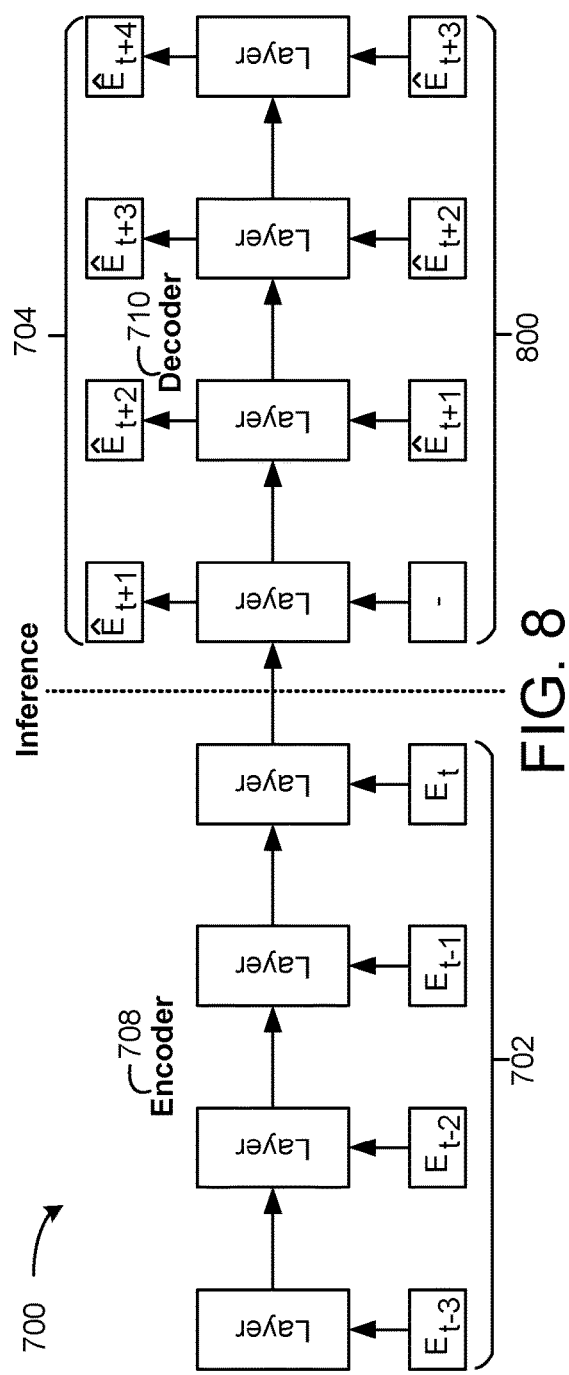

| Outside Air Temperature Training Data |
|---|
| $X_i^0 = \{X_{non\text{-}oat}, \{\hat{X}_{oat,t+1}, \ldots, \hat{X}_{oat,t+N-1}, \hat{X}_{oat,t+N}\},$ $\{I_{oat,t+1} = 1, \ldots, I_{oat,t+N-1} = 1, I_{oat,t+N} = 1\}\}, \{E_{t+1}, E_{t+2}, \ldots, E_{t+N}\}$ |
| $X_i^1 = \{X_{non\text{-}oat}, \{\hat{X}_{oat,t+1}, \ldots, \hat{X}_{oat,t+N-1}, \hat{X}_{oat,t+N} = d\},$ $\{I_{oat,t+1} = 1, \ldots, I_{oat,t+N-1} = 1, I_{oat,t+N} = 0\}\}, \{E_{t+1}, E_{t+2}, \ldots, E_{t+N}\}$ |
| $X_i^2 = \{X_{non\text{-}oat}, \{\hat{X}_{oat,t+1}, \ldots, \hat{X}_{oat,t+N-1} = d, \hat{X}_{oat,t+N} = d\},$ $\{I_{oat,t+1} = 1, \ldots, I_{oat,t+N-1} = 0, I_{oat,t+N} = 0\}\}, \{E_{t+1}, E_{t+2}, \ldots, E_{t+N}\}$ |
| $X_i^3 = \{X_{non\text{-}oat}, \{\hat{X}_{oat,t+1} = d, \ldots, \hat{X}_{oat,t+N-1} = d, \hat{X}_{oat,t+N} = d\},$ $\{I_{oat,t+1} = 0, \ldots, I_{oat,t+N-1} = 0, I_{oat,t+N} = 0\}\}, \{E_{t+1}, E_{t+2}, \ldots, E_{t+N}\}$ |

FIG. 13

BUILDING SYSTEM WITH SELECTIVE USE OF DATA FOR PROBABILISTIC FORECASTING

BACKGROUND

The present disclosure relates generally to building systems. More particularly, the present disclosure relates to selecting data forecasts to use as inputs into prediction models of building systems.

Building energy consumption constitutes approximately seventy two percent of overall electricity consumption in the United States. It may be important for building managers to be equipped with energy forecasts for their buildings several hours in advances so that building managers can plan activities to both reduce the carbon footprint and the cost of electricity for their building. To improve the accuracy of the energy forecasts, past data associated with data points of a building such as building occupancy and weather condition values may be utilized to generate the building energy forecast. Building managers may implement external services that provide forecasts directed to data such as outside air temperature to generate the building energy forecast. Unfortunately, the external services may provide inaccurate data. Without being able to differentiate between accurate and inaccurate forecasts, building managers may generate inaccurate energy forecasts based on the inaccurate data.

SUMMARY

Selective Use of Data for Probabilistic Forecasting

One implementation of the present disclosure is a building system for generating input forecast data, the building system may comprise one or more memory devices configured to store instructions thereon that, when executed by one or more processors, cause the one or more processors to retrieve a current prediction set of measurements comprising current values associated with a plurality of time-steps; identify time-steps of the plurality of time-steps for which historical prediction values of a historical prediction set of measurements are outside of a tolerance of corresponding historical actual values of a historical actual set of measurements; replace each current value of the current prediction set of measurements that is associated with the identified time-steps with a predetermined value to generate an updated prediction set of measurements; and provide the updated prediction set of measurements to a prediction model.

In some embodiments, the instructions cause the one or more processors to predict, using the prediction model and based on the updated prediction set, for one or more time-steps into the future, an expected energy output indicating an expected amount of energy that the building system will utilize at each of the one or more time-steps.

In some embodiments, the instructions cause the one or more processors to perform at least one of operate one or more pieces of building equipment based on the expected energy output; or generate one or more user interfaces including interface elements, the interface elements based on the expected energy output.

In some embodiments, the one or more processors identify time-steps of the plurality of time-steps by obtaining the historical prediction set of measurements and the historical actual set of measurements for the plurality of time-steps, each of the plurality of time-steps associated with a historical prediction value of the historical prediction set of measurements and a historical value of the historical actual set of measurements; determining whether the historical prediction values of the historical prediction set of measurements are within a tolerance threshold of corresponding historical values of the historical actual set of measurements; and identifying time-steps that are associated with historical values of the historical prediction set of measurements that are outside of the tolerance threshold.

In some embodiments, the instructions cause the one or more processors to determine whether historical values of the historical prediction set of measurements are within a tolerance threshold by determining, for each of the plurality of time-steps, a coefficient of variation of a root-mean-square error (CV-RMSE) value based on the historical values of the historical prediction set of measurements and the historical values of the historical actual set of measurements; and comparing the CV-RMSE values of each time-step to the tolerance threshold.

In some embodiments, the tolerance threshold is unique to each time-step.

In some embodiments, the instructions cause the one or more processors to determine whether values of the historical prediction set of measurements are within a tolerance threshold by determining, for each of the plurality of time-steps, a CV-RMSE value based on the historical values of the historical prediction set of measurements and the historical values of the historical actual set of measurements; determining, for each of the plurality of time-steps, a cumulative sum (CUSUM) value based on the CV-RMSE value of the time-step; and comparing the CUSUM value of each time-step to the tolerance threshold.

In some embodiments, the instructions cause the one or more processors to identify time-steps of the plurality of time-steps by receiving an indication of the time-steps from an external system and identifying time-steps from the indication.

In some embodiments, the predetermined value is a dummy value indicating for the prediction model to ignore any prediction data associated with a time-step associated with the predetermined value.

In some embodiments, the instructions cause the one or more processors to generate input data that indicates index values of the updated prediction set of measurements that are associated with the predetermined value; and provide the input data to the predictive model.

Another implementation of the present disclosure is a method for generating input forecast data. The method comprises obtaining, by a processing circuit, a historical prediction set of measurements and a historical actual set of measurements for a plurality of time-steps, each of the plurality of time-steps associated with a historical value of the historical prediction set of measurements and a historical value of the historical actual set of measurements; determining, by the processing circuit, whether historical values of the historical prediction set of measurements are within a tolerance threshold of corresponding historical values of the historical actual set of measurements; and identifying, by the processing circuit, time-steps that are associated with historical values of the historical prediction set of measurements that are outside of the tolerance threshold. The method further comprising retrieving, by the processing circuit, a current prediction set of measurements comprising current values associated with the plurality of time-steps; replacing, by the processing circuit, each current value of the current prediction set of measurements that is associated with the identified time-steps with a predetermined value to generate an updated prediction set of measurements; and providing, by the processing circuit, the updated prediction set of measurements to a prediction model.

In some embodiments, the method further comprises predicting, by the processing circuit using the prediction model and based on the updated prediction set, for one or more time-steps into the future, an expected energy output indicating an expected amount of energy that the building system will utilize at each of the one or more time-steps.

In some embodiments, the method further comprises operating, by the processing circuit, one or more pieces of building equipment based on the expected energy output; or generating, by the processing circuit, one or more user interfaces including interface elements, the interface elements based on the expected energy output.

In some embodiments, the historical prediction set of measurements comprises historical values associated with outside air temperature, plug load schedule, light load schedule, occupancy, or scheduling information.

In some embodiments, determining whether historical values of the historical prediction set of measurements are within a tolerance threshold comprises determining, by the processing circuit, for each of the plurality of time-steps, a coefficient of variation of a root-mean-square error (CV-RMSE) value based on the historical values of the historical prediction set of measurements and the historical values of the historical actual set of measurements; and comparing, by the processing circuit, the CV-RMSE values of each time-step to the tolerance threshold.

In some embodiments, the tolerance threshold is unique to each time-step.

In some embodiments, determining whether historical values of the historical prediction set of measurements are within a tolerance threshold comprises determining, by the processing circuit, for each of the plurality of time-steps, a CV-RMSE value based on the historical values of the historical prediction set of measurements and the historical values of the historical actual set of measurements; determining, by the processing circuit, for each of the plurality of time-steps, a cumulative sum (CUSUM) value based on the CV-RMSE value of the time-step; and comparing, by the processing circuit, the CUSUM value of each time-step to the tolerance threshold.

In some embodiments, the method further comprises generating, by the processing circuit, an alert for each time-step that is associated with a CUSUM value that exceeds the tolerance threshold.

In some embodiments, the predetermined value is a dummy value indicating for the prediction model to ignore any prediction data associated with a time-step associated with the predetermined value.

Yet another implementation of the present disclosure is a non-transitory computer-readable storage medium having instructions stored thereon that, upon execution by a processor, cause the processor to perform operations to generate forecast input data, the operations comprising obtaining a historical prediction set of measurements and a historical actual set of measurements for a plurality of time-steps, each of the plurality of time-steps associated with a historical value of the historical prediction set of measurements and a historical value of the historical actual set of measurements; determining whether historical values of the historical prediction set of measurements are within a tolerance threshold of corresponding historical values of the historical actual set of measurements; and identifying time-steps that are associated with historical values of the historical prediction set of measurements that are outside of the tolerance threshold. The instructions further cause the process to perform the operations of retrieving a current prediction set of measurements comprising current values associated with the plurality of time-steps; replacing each current value of the current prediction set of measurements that is associated with the identified time-steps with a predetermined value to generate an updated prediction set of measurements; and providing the updated prediction set of measurements to a prediction model.

Model Training to Handle Selective Forecast Data

One implementation of the present disclosure is a building system for training a prediction model with augmented training data. The building system comprises one or more memory devices configured to store instructions thereon that, when executed by one or more processors, cause the one or more processors to obtain a first training data set comprising historical prediction data values associated with a data point of the building system and with a plurality of time-steps and historical actual energy values associated with consumption of the building system at each of the plurality of time-steps; generate an augmented training data set, the augmented training data set comprising the first training data set and a second training data set, the second training data set comprising the historical actual energy values and the historical prediction data values of the first training data set but with a historical prediction data value replaced with a predetermined value at a time-step of the plurality of time-steps; and generate a prediction model by training the prediction model using the augmented training data set.

In some embodiments, the augmented training data set comprises a third training data set, the third training data set comprising the historical actual energy values and the historical prediction data values of the second training data set but with a second historical data value replaced with the predetermined value at a second time-step of the plurality of time-steps.

In some embodiments, the augmented training data set comprises a fourth training data set, the fourth training data set comprising the historical actual energy values and the predetermined value at each of the plurality of time-steps.

In some embodiments, the instructions cause the one or more processors to receive a current prediction data set comprising a plurality of current prediction data values, the plurality of current prediction data values associated with the data point and with the plurality of time-steps; and predict, using the prediction model and based on the current prediction data set, for one or more time-steps into the future, an expected energy output indicating an expected amount of energy that the building system will utilize at each of the plurality of time-steps.

In some embodiments, the instructions cause the one or more processors to perform at least one of operate one or more pieces of building equipment based on the expected energy output; or generate one or more user interfaces including interface elements, the interface elements based on the expected energy output.

In some embodiments, the instructions cause the one or more processors to receive a third training data set, the third training data set comprising the plurality of current prediction data values and current actual energy values associated with the current prediction data values; generate a second augmented training data set, the second augmented training data set comprising the third training data set and a fourth training data set, the fourth training data set comprising the current actual energy values and the current prediction data values of the third training data set but with a current prediction data value replaced with the predetermined value at a second time-step of the plurality of time-steps; and train the prediction model using the second augmented training data set.

In some embodiments, the first training data set comprises second historical data values associated with a second data point of the building system, wherein the second historical data values are associated with historical actual values of the second data point at each of the plurality of time-steps.

In some embodiments, the data point is associated with outside air temperature, plug load schedule, light load schedule, occupancy, or scheduling information.

In some embodiments, the augmented training data set comprises an indicator training data set, the indicator training data set indicating time-steps of the first training data set that are associated with the predetermined value.

In some embodiments, the augmented training data set comprises a second indicator training data set, the second indicator training data set indicating second time-steps of the second training data set that are associated with the predetermined value.

In some embodiments, the historical data values are associated with historical predictions of a historical value of the data point at each of the plurality of time-steps.

Another implementation of the present disclosure is a method for training a prediction model with augmented training data. The method comprises obtaining, by a processing circuit, a first training data set comprising historical prediction data values associated with a data point of the building system and with a plurality of time-steps and historical actual energy values associated with consumption of a building system at each of the plurality of time-steps; generating, by the processing circuit, an augmented training data set, the augmented training data set comprising the first training data set and a second training data set, the second training data set comprising the historical actual energy values and the historical prediction data values of the first training data set but with a historical prediction data value replaced with a predetermined value at a time-step of the plurality of time-steps; and generating, by the processing circuit, a prediction model by training the prediction model using the augmented training data set.

In some embodiments, the augmented training data set comprises a third training data set, the third training data set comprising the historical actual energy values and the historical prediction data values of the second training data set but with a second historical prediction data value replaced with the predetermined value at a second time-step of the plurality of time-steps.

In some embodiments, the augmented training data set comprises a fourth training data set, the fourth training data set comprising the historical actual energy values and the predetermined value at each of the plurality of time-steps.

In some embodiments, the method comprises receiving, by the processing circuit, a current prediction data set comprising a plurality of current prediction data values, the plurality of current prediction data values associated with the data point and with the plurality of time-steps; and predicting, by the processing circuit, using the prediction model and based on the current prediction data set, for one or more time-steps into the future, an expected energy output indicating an expected amount of energy that the building system will utilize at each of the plurality of time-steps.

In some embodiments, the method comprises operating, by the processing circuit, one or more pieces of building equipment based on the expected energy output; or generating, by the processing circuit, one or more user interfaces including interface elements, the interface elements based on the expected energy output.

In some embodiments, the method comprises receiving, by the processing circuit, a third training data set, the third training data set comprising the plurality of current prediction data values and current actual energy values associated with the current prediction data values; generating, by the processing circuit, a second augmented training data set, the second augmented training data set comprising the third training data set and a fourth training data set, the fourth training data set comprising the current actual energy values and the current prediction data values of the third training data set but with a current prediction data value replaced with the predetermined value at a second time-step of the plurality of time-steps; and training, by the processing circuit, the prediction model using the second augmented training data set.

In some embodiments, the first training data set comprises second historical actual data values associated with a second data point of the building system, wherein the second historical actual data values are associated with historical actual values of the second data point at each of the plurality of time-steps.

In some embodiments, the data point is associated with outside air temperature, plug load schedule, light load schedule, occupancy, or scheduling information.

Yet another implementation of the present disclosure is a non-transitory computer-readable storage medium having instructions stored thereon that, upon execution by a processor, cause the processor to perform operations to train a prediction model with augmented data. The operations comprise obtaining a first training data set comprising historical prediction data values associated with a data point of a building system and with a plurality of time-steps and historical actual energy values associated with consumption of the building system at each of the plurality of time-steps; generating an augmented training data set, the augmented training data set comprising the first training data set and a second training data set, the second training data set comprising the historical actual energy values and the historical prediction data values of the first training data set but with a historical prediction data value replaced with a predetermined value at a time-step of the plurality of time-steps; and generating a prediction model by training the prediction model using the augmented training data set.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 7 is a block diagram of a LSTM S2S neural network for non-probabilistic energy forecasting is shown during a training phase, according to an exemplary embodiment.

FIG. 8 is a block diagram of a LSTM S2S neural network for non-probabilistic energy forecasting is shown during an inference phase, according to an exemplary embodiment.

FIG. 13 is an augmented training data set that can be used to generate a prediction model for energy forecasting, according to an exemplary embodiment.

DETAILED DESCRIPTION

Overview

Figure 1:
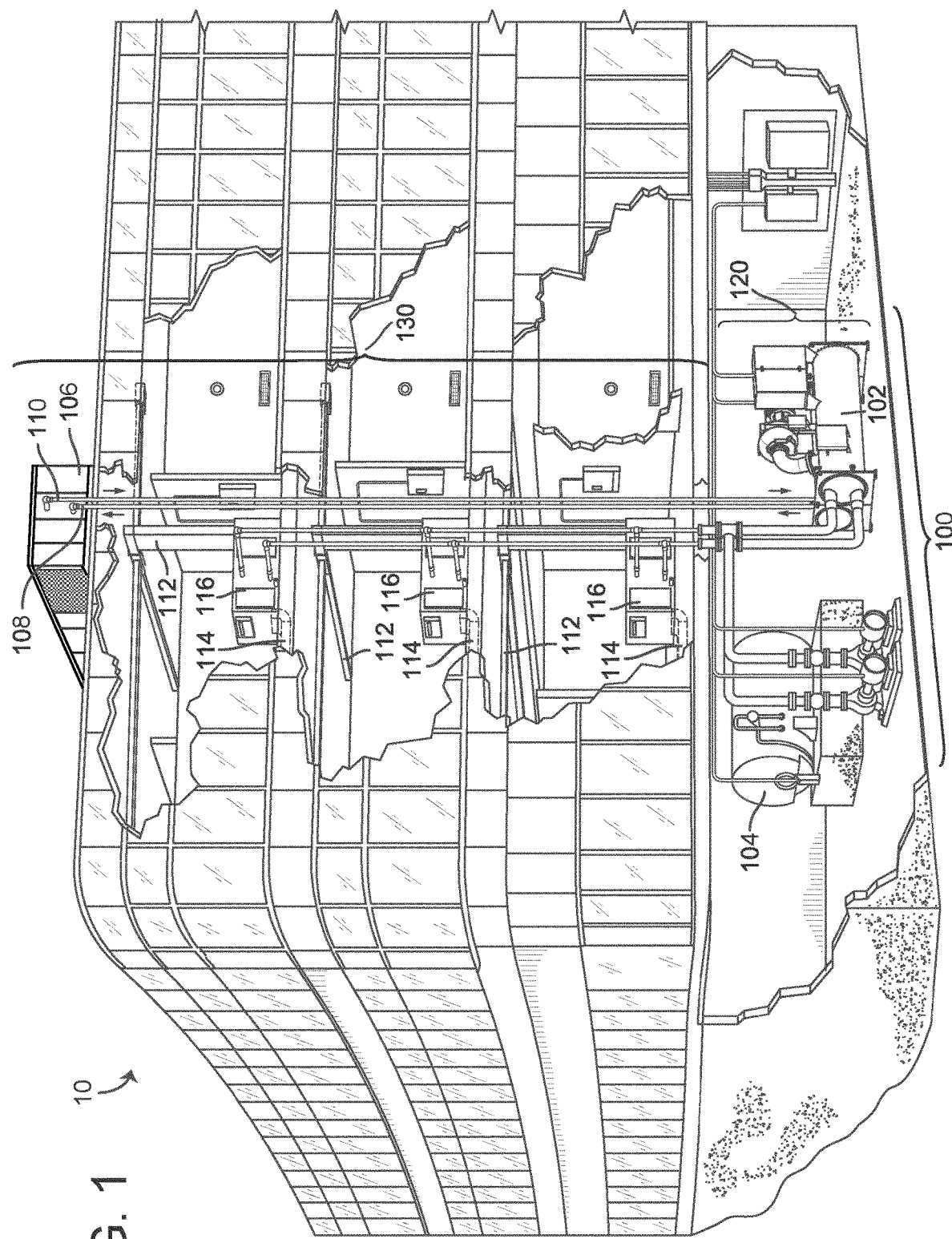
FIG. 1 is a drawing of a building equipped with a HVAC system, according to an exemplary embodiment.

Referring generally to the FIGURES, a building system with a forecast selection system is shown, according to an exemplary embodiment. The building system can be configured to generate and train a prediction model. The building system can further be configured to generate a probabilistic data point forecast based on the prediction model. A probabilistic forecast may be a forecast for a particular data point indicating the probability that, at one or multiple future times, the data point will be a particular value. The prediction model can be configured to predict probabilities of values for any kind of data point, for example, ambient temperature, energy usage of a building or campus, ambient humidity, occupancy, and/or any other building data point.

In some embodiments, many different types of prediction models can be trained by the building system. Examples of prediction models include, but are not limited to, neural networks, Bayesian networks, decision trees, etc. In some embodiments, the prediction model is a recurrent neural network (RNN). For example, a long-short term memory (LSTM) sequence to sequence (S2S) neural network (a type of RNN) and/or any other type of RNN can be utilized by the building system as the prediction model, i.e., to predict a particular point forecast and/or probabilistic forecast of a data point. In some embodiments, one or more specific methodologies can be used by the building system to implement a probabilistic forecast for one or multiple time-steps into the future to train a LSTM S2S neural network, i.e., to feed a probabilistic forecast of one time-step into the LSTM S2S to generate a probabilistic-forecast for a second subsequent time-step. The networks can predict the particular point forecast and/or probabilistic forecast based on one or multiple current and historical values of a data point.

Selective Use of Data for Probabilistic Forecasting

A building manager may desire to ensure that only accurate forecast data is input into the prediction model when determining probabilities of values (e.g., forecasts) across time-steps for a particular data point. The building system may use forecasts (or prediction data) generated by external data source providers to determine the probabilities for the values. For example, an external weather service may provide an outside air temperature forecast for each hour of the next 24 hours. The external weather service may provide inaccurate forecasts for a portion of the hours because it relies on inaccurate sensors, out-of-date equipment, or internal processes that may cause the external weather service to generate faulty forecasts at different time-steps. To account for these issues, the building manager may seek to determine the accuracy of the external weather service at each hour of the 24 hours and/or in the time leading up to each hour. The building system may automatically determine time-steps for which the external weather service provides inaccurate data and set incoming prediction forecast values associated with the determined time-steps to a predetermined value so the prediction model can account for them when generating prediction data. Consequently, the building manager can ensure that probability data that the prediction model provides are based on more accurate data.

To identify time-steps for which a data source provider may provide inaccurate data, the building system may determine differences between forecast values of time-steps of a forecast and actual values of corresponding values of the forecast and identify time-steps where the predicted values differ by an amount exceeding a threshold set by an administrator. The building system may identify time-steps where these instances occur and avoid using data from the data source provider that is associated with the identified time-steps. More specifically, the building system may determine a CV-RMSE value and/or a CUSUM value for each time-step of a forecast that the data source provider provides. The building system may compare the CV-RMSE value or the CUSUM value to a threshold associated with the time-step to determine whether the forecast is accurate to the threshold. If the CV-RMSE value or the CUSUM value exceeds the threshold, the building system may identify the time-step associated with the value that exceeds the threshold and replace values associated with the time-step of any future forecasts with a predetermined value that may not contribute to processes that the prediction model performs to generate probabilistic data. Consequently, the building system may only use accurate data when predicting values for a data point of the building system.

Model Training to Handle Selective Forecasting

The building manager may desire to train the prediction model to handle forecast data that includes predetermined values at one or more time-steps that the building system has determined to use in place of the forecast data. In some instances, to handle such data, the building manger may need to implement multiple prediction models, each prediction model configured to handle a varying number of predetermined values. This can lead to problems as training each model may be time consuming. Further, having multiple models may cause inaccuracies in generating predictions. Finally, if one prediction model is implemented to handle the forecast data, it may take a long time to train the model to handle data with varying amount of predetermined values without a standardized method of generating training data sets to account for each amount.

The systems and method provided herein provide for a method of generating augmented training data that can be used to train and generate a prediction model that can handle various degrees of missing forecast data (e.g., forecast data that has been replaced with predetermined values). The building system may obtain a training data set may include forecast data values related to a point of the building system at various time-steps, realized values of other points at the various time-steps (e.g., actual measured values at the time-steps), and realized values associated with the energy output point of the building system at the time-steps. The building system may generate an augmented training data set including a second training data set that includes the same data values as the other training data set but with a forecast value associated with the last time-step replaced with a predetermined value. The augmented training data set may include further training data sets that each include more predetermined values that have replaced forecast values of the original training dataset. The building system may use the augmented training data set to train and generate the prediction model of the building system to generate probabilities for values of a point (e.g., expected energy output) at future time-steps. Advantageously, by using the augmented training data set to generate and train the prediction model, the prediction model may handle various degrees of missing forecast data.

Building Management System and HVAC System

Referring now to FIG. 1, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
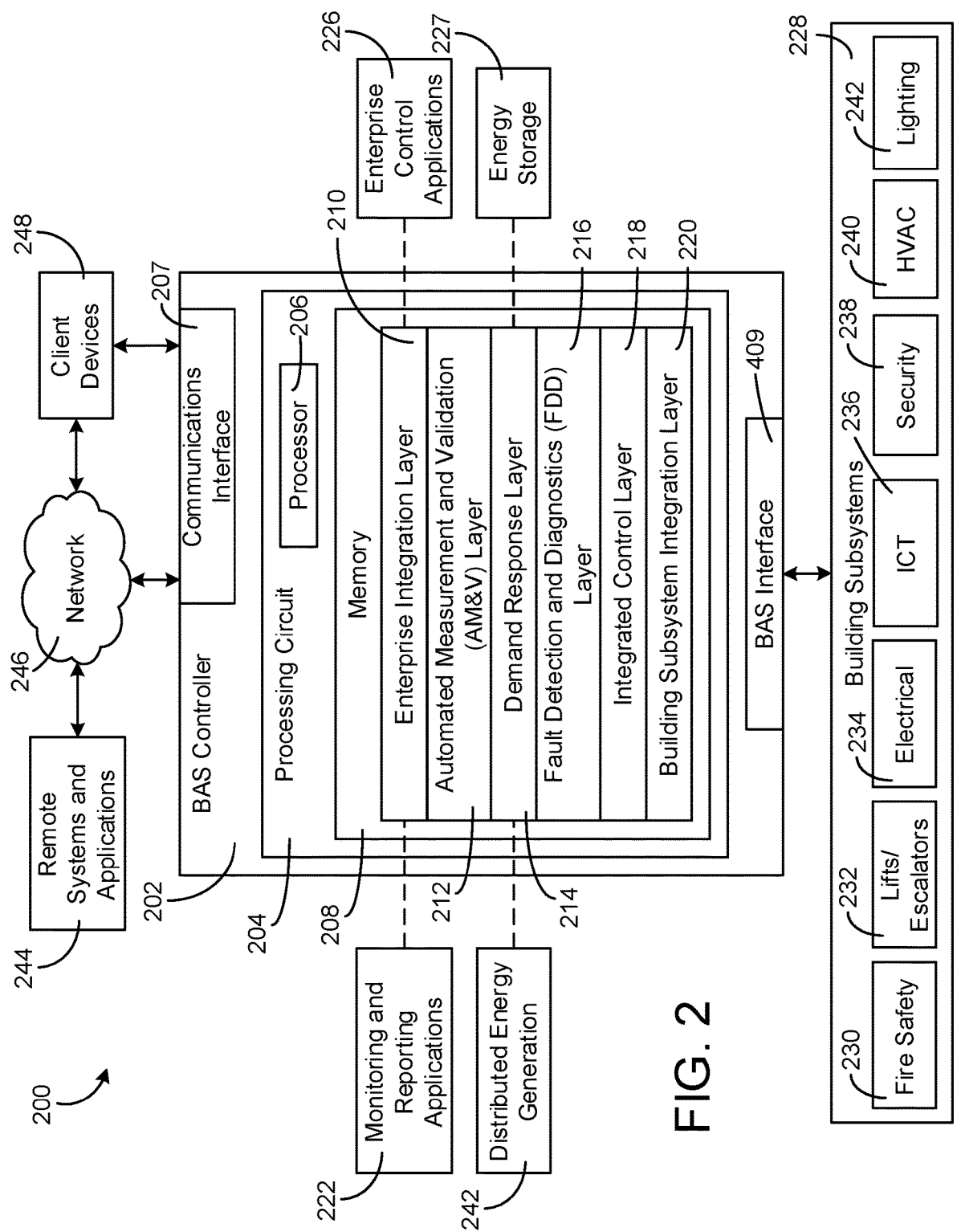
FIG. 2 is a block diagram of a building automation system (BAS) that may be used to monitor and/or control the building of FIG. 1, according to an exemplary embodiment.

Referring now to FIG. 2, a block diagram of a building automation system (BAS) 200 is shown, according to an exemplary embodiment. BAS 200 can be implemented in building 10 to automatically monitor and control various building functions. BAS 200 is shown to include BAS controller 202 and a plurality of building subsystems 228. Building subsystems 228 are shown to include a building electrical subsystem 234, an information communication technology (ICT) subsystem 236, a security subsystem 238, a HVAC subsystem 240, a lighting subsystem 242, a lift/escalators subsystem 232, and a fire safety subsystem 230. In various embodiments, building subsystems 228 can include fewer, additional, or alternative subsystems. For example, building subsystems 228 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 228 include a waterside system and/or an airside system. A waterside system and an airside system are described with further reference to U.S. patent application Ser. No. 15/631,830 filed Jun. 23, 2017, the entirety of which is incorporated by reference herein.

Each of building subsystems 228 can include any number of devices, controllers, and connections for completing its individual functions and control activities. HVAC subsystem 240 can include many of the same components as HVAC system 100, as described with reference to FIG. 1. For example, HVAC subsystem 240 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 242 can include any number of light fixtures, ballasts, lighting sensors, dimmers, or other devices configured to controllably adjust the amount of light provided to a building space. Security subsystem 238 can include occupancy sensors, video surveillance cameras, digital video recorders, video processing servers, intrusion detection devices, access control devices and servers, or other security-related devices.

Still referring to FIG. 2, BAS controller 266 is shown to include a communications interface 207 and a BAS interface 209. Interface 207 can facilitate communications between BAS controller 202 and external applications (e.g., monitoring and reporting applications 222, enterprise control applications 226, remote systems and applications 244, applications residing on client devices 248, etc.) for allowing user control, monitoring, and adjustment to BAS controller 266 and/or subsystems 228. Interface 207 can also facilitate communications between BAS controller 202 and client devices 248. BAS interface 209 can facilitate communications between BAS controller 202 and building subsystems 228 (e.g., HVAC, lighting security, lifts, power distribution, business, etc.).

Interfaces 207, 209 can be or include wired or wireless communications interfaces (e.g., jacks, antennas, transmitters, receivers, transceivers, wire terminals, etc.) for conducting data communications with building subsystems 228 or other external systems or devices. In various embodiments, communications via interfaces 207, 209 can be direct (e.g., local wired or wireless communications) or via a communications network 246 (e.g., a WAN, the Internet, a cellular network, etc.). For example, interfaces 207, 209 can include an Ethernet card and port for sending and receiving data via an Ethernet-based communications link or network. In another example, interfaces 207, 209 can include a Wi-Fi transceiver for communicating via a wireless communications network. In another example, one or both of interfaces 207, 209 can include cellular or mobile phone communications transceivers. In one embodiment, communications interface 207 is a power line communications interface and BAS interface 209 is an Ethernet interface. In other embodiments, both communications interface 207 and BAS interface 209 are Ethernet interfaces or are the same Ethernet interface.

Still referring to FIG. 2, BAS controller 202 is shown to include a processing circuit 204 including a processor 206 and memory 208. Processing circuit 204 can be communicably connected to BAS interface 209 and/or communications interface 207 such that processing circuit 204 and the various components thereof can send and receive data via interfaces 207, 209. Processor 206 can be implemented as a general purpose processor, an application specific integrated circuit (ASIC), one or more field programmable gate arrays (FPGAs), a group of processing components, or other suitable electronic processing components.

Memory 208 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 208 can be or include volatile memory or non-volatile memory. Memory 208 can include database components, object code components, script components, or any other type of information structure for supporting the various activities and information structures described in the present application. According to an exemplary embodiment, memory 208 is communicably connected to processor 206 via processing circuit 204 and includes computer code for executing (e.g., by processing circuit 204 and/or processor 206) one or more processes described herein.

Figure 4:
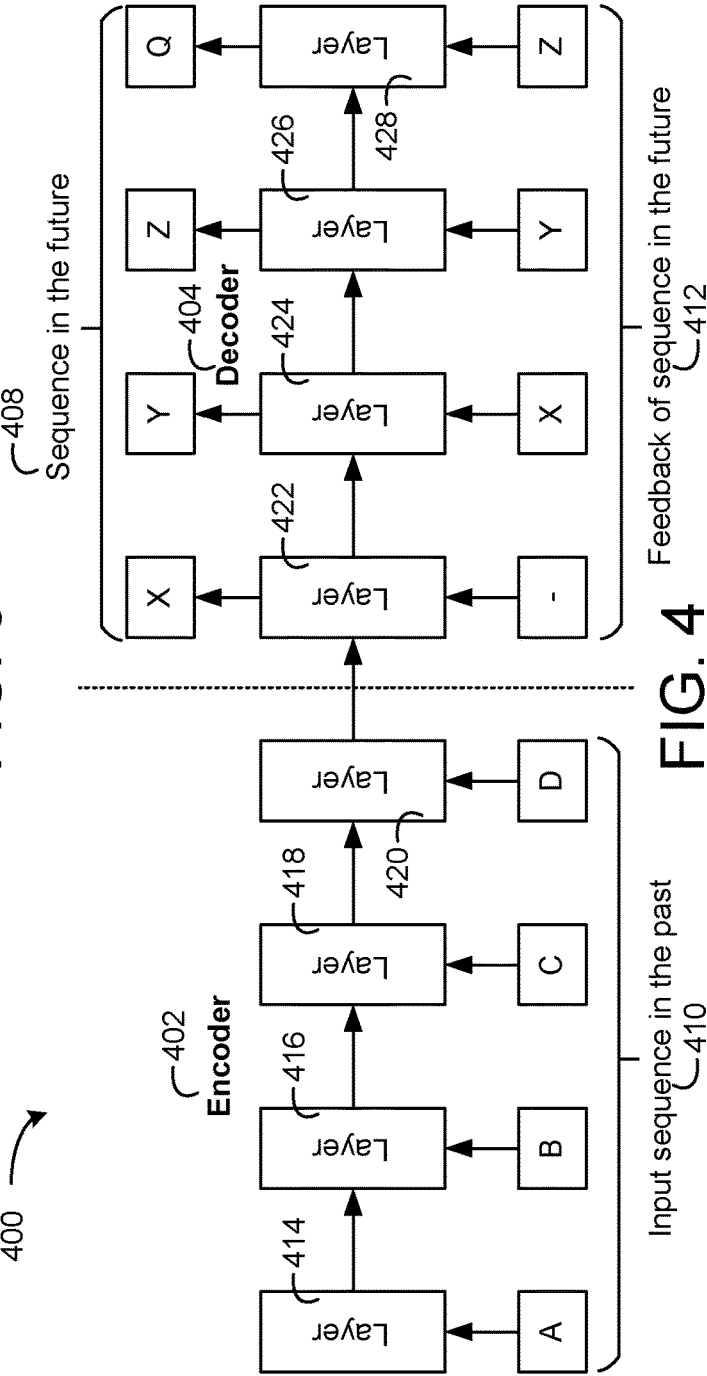
FIG. 4 is a block diagram of a long-short term memory sequence to sequence (LSTM S2S) neural network, according to an exemplary embodiment.

In some embodiments, BAS controller 202 is implemented within a single computer (e.g., one server, one housing, etc.). In various other embodiments BAS controller 202 can be distributed across multiple servers or computers (e.g., that can exist in distributed locations). Further, while FIG. 4 shows applications 222 and 226 as existing outside of BAS controller 202, in some embodiments, applications 222 and 226 can be hosted within BAS controller 202 (e.g., within memory 208).

Still referring to FIG. 2, memory 208 is shown to include an enterprise integration layer 210, an automated measurement and validation (AM&V) layer 212, a demand response (DR) layer 214, a fault detection and diagnostics (FDD) layer 216, an integrated control layer 218, and a building subsystem integration later 220. Layers 210-220 is configured to receive inputs from building subsystems 228 and other data source providers, determine optimal control actions for building subsystems 228 based on the inputs, generate control signals based on the optimal control actions, and provide the generated control signals to building subsystems 228 in some embodiments. The following paragraphs describe some of the general functions performed by each of layers 210-220 in BAS 200.

Enterprise integration layer 210 can be configured to serve clients or local applications with information and services to support a variety of enterprise-level applications. For example, enterprise control applications 226 can be configured to provide subsystem-spanning control to a graphical user interface (GUI) or to any number of enterprise-level business applications (e.g., accounting systems, user identification systems, etc.). Enterprise control applications 226 can also or alternatively be configured to provide configuration GUIs for configuring BAS controller 202. In yet other embodiments, enterprise control applications 226 can work with layers 210-220 to optimize building performance (e.g., efficiency, energy use, comfort, or safety) based on inputs received at interface 207 and/or BAS interface 209.

Building subsystem integration layer 220 can be configured to manage communications between BAS controller 202 and building subsystems 228. For example, building subsystem integration layer 220 can receive sensor data and input signals from building subsystems 228 and provide output data and control signals to building subsystems 228. Building subsystem integration layer 220 can also be configured to manage communications between building subsystems 228. Building subsystem integration layer 220 translate communications (e.g., sensor data, input signals, output signals, etc.) across a plurality of multi-vendor/multi-protocol systems.

Demand response layer 214 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 224, from energy storage 227, or from other sources. Demand response layer 214 can receive inputs from other layers of BAS controller 202 (e.g., building subsystem integration layer 220, integrated control layer 218, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 214 includes control logic for responding to the data and signals it receives. These responses can include communicating with the control algorithms in integrated control layer 218, changing control strategies, changing setpoints, or activating/deactivating building equipment or subsystems in a controlled manner. Demand response layer 214 can also include control logic configured to determine when to utilize stored energy. For example, demand response layer 214 can determine to begin using energy from energy storage 227 just prior to the beginning of a peak use hour.

In some embodiments, demand response layer 214 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 214 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 214 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 218 can be configured to use the data input or output of building subsystem integration layer 220 and/or demand response later 214 to make control decisions. Due to the subsystem integration provided by building subsystem integration layer 220, integrated control layer 218 can integrate control activities of the subsystems 228 such that the subsystems 228 behave as a single integrated supersystem. In an exemplary embodiment, integrated control layer 218 includes control logic that uses inputs and outputs from a plurality of building subsystems to provide greater comfort and energy savings relative to the comfort and energy savings that separate subsystems could provide alone. For example, integrated control layer 218 can be configured to use an input from a first subsystem to make an energy-saving control decision for a second subsystem. Results of these decisions can be communicated back to building subsystem integration layer 220.

Integrated control layer 218 is shown to be logically below demand response layer 214. Integrated control layer 218 can be configured to enhance the effectiveness of demand response layer 214 by enabling building subsystems 228 and their respective control loops to be controlled in coordination with demand response layer 214. This configuration can reduce disruptive demand response behavior relative to conventional systems. For example, integrated control layer 218 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 218 can be configured to provide feedback to demand response layer 214 so that demand response layer 214 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 218 is also logically below fault detection and diagnostics layer 216 and automated measurement and validation layer 212. Integrated control layer 218 can be configured to provide calculated inputs (e.g., aggregations) to these higher levels based on outputs from more than one building subsystem.

Automated measurement and validation (AM&V) layer 212 can be configured to verify that control strategies commanded by integrated control layer 218 or demand response layer 214 are working properly (e.g., using data aggregated by AM&V layer 212, integrated control layer 218, building subsystem integration layer 220, FDD layer 216, or otherwise). The calculations made by AM&V layer 212 can be based on building system energy models and/or equipment models for individual BAS devices or subsystems. For example, AM&V layer 212 can compare a model-predicted output with an actual output from building subsystems 228 to determine an accuracy of the model.

Fault detection and diagnostics (FDD) layer 216 can be configured to provide on-going fault detection for building subsystems 228, building subsystem devices (i.e., building equipment), and control algorithms used by demand response layer 214 and integrated control layer 218. FDD layer 216 can receive data inputs from integrated control layer 218, directly from one or more building subsystems or devices, or from another data source provider. FDD layer 216 can automatically diagnose and respond to detected faults. The responses to detected or diagnosed faults can include providing an alarm message to a user, a maintenance scheduling system, or a control algorithm configured to attempt to repair the fault or to work-around the fault.

FDD layer 216 can be configured to output a specific identification of the faulty component or cause of the fault (e.g., loose damper linkage) using detailed subsystem inputs available at building subsystem integration layer 220. In other exemplary embodiments, FDD layer 216 is configured to provide "fault" events to integrated control layer 218 which executes control strategies and policies in response to the received fault events. According to an exemplary embodiment, FDD layer 216 (or a policy executed by an integrated control engine or business rules engine) can shut-down systems or direct control activities around faulty devices or systems to reduce energy waste, extend equipment life, or assure proper control response.

FDD layer 216 can be configured to store or access a variety of different system data stores (or data points for live data). FDD layer 216 can use some content of the data stores to identify faults at the equipment level (e.g., specific chiller, specific AHU, specific terminal unit, etc.) and other content to identify faults at component or subsystem levels. For example, building subsystems 228 can generate temporal (i.e., time-series) data indicating the performance of BAS 200 and the various components thereof. The data generated by building subsystems 228 can include measured or calculated values that exhibit statistical characteristics and provide information about how the corresponding system or process (e.g., a temperature control process, a flow control process, etc.) is performing in terms of error from its setpoint. These processes can be examined by FDD layer 216 to expose when the system begins to degrade in performance and alarm a user to repair the fault before it becomes more severe.

Probabilistic Data Point Forecast

Figure 3:
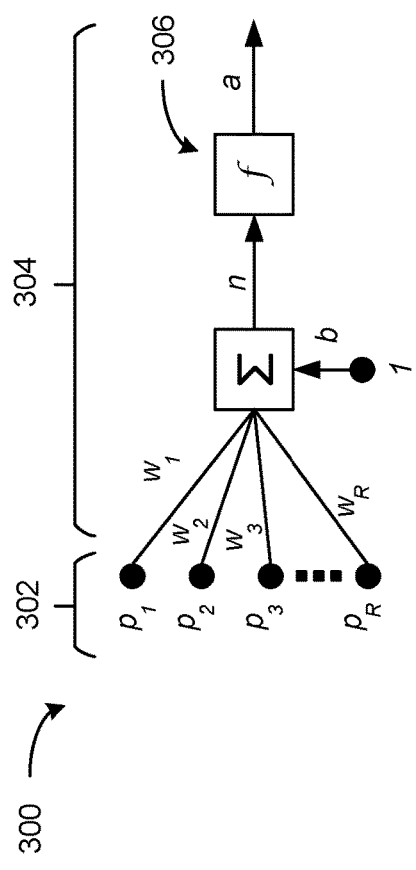
FIG. 3 is a block diagram of for a neural network, according to an exemplary embodiment.

Referring now to FIG. 3, a neuron 300 that can be used in a neural network is shown, according to an exemplary embodiment. In a neural network, many neurons 300 can be used to generate an output from an input. The neuron 300 can be configured to include one or more input signals 302 and a neuron body 304. In some embodiments, the input signals 302 are provided by a particular data source provider. In other embodiments, the input signals 302 are provided by a previous neural network layer having one or more neurons 300. The neuron body 304 includes a series of weights assigned to each of the input signals 302 by which each input signal is multiplied in the neural network. The neuron body 304 also includes a summation operation which takes the product all input signals 302 and their associated weights and add them together. Furthermore, a single bias value, b, is assigned to each neuron 300 and added to the sum of all weighted input signals 302. The weights and bias values can vary between the neurons 300 used in a neural network. In some embodiments, the summation operation is defined as follows:

$$n = b + \sum_{x=1}^{R}(p_x \times w_x)$$

The output of the summation operation and bias value is denoted as n in FIG. 3. The output, n, may then be provided as input to an activation function 306. The activation function 306 is a function applied to n for each neuron 300 in order to adjust the neuron activation level into some that range of values. In some embodiments, the activation function 306 is applied to the output, n, to transform the output into some real number between zero and one. In some embodiments, the activation function 306 is configured as a sigmoid function having the following form:

$$a = \frac{1}{1+e^x}$$

In another embodiment, the activation function 306 could be configured as a rectified linear unit function (ReLU) having the following form:

$$a = \max(0, x)$$

In other embodiments, the activation function 306 could be some other linear or nonlinear function. The activation function 306 can be configured to create an activation level, a, within the desired range of real numbers. In some embodiments, the activation level of each neuron 300 is then provided as an input signal 302 to the neurons 300 of the next layer of the convolutional neural network. In some embodiments, the activation function 306 can be a tanh activation.

Referring now to FIG. 4, a LSTM S2S neural network 400 is shown, according to an exemplary embodiment. The LSTM S2S neural network 400 is a type of RNN S2S neural network and is made of two main components, an encoder 402 and a decoder 404. The encoder 402 can receive an input sequence of a data point in the past, i.e., sequence 410. The decoder 404 can generate a sequence in the future for the data point. Furthermore, the decoder can receive feedback input sequence 412 into the decoder 404 where the sequence 412 is at least a portion of the sequence 408.

The encoder 402 can be configured to transform a sequence into a vector which is passed to the decoder 404. More specifically, the encoder 402 can be configured to generate the vector based on the sequence 410. The decoder 404 can be configured to generate a sequence based on the vector of the encoder 402 (as well as other inputs). Both the encoder 402 and the decoder 404 can include multiple layers, i.e., layers 414-428. Each of the layers 414-428 can be LSTM layers and/or deep LSTM layers. Exemplary types of RNN layers are described with reference to FIGS. 5-6. Other types of layers may be GRU or GTU neural network layers.

The sequences 408, 410, and 412 can represent historical values of a data point (the sequence 410), predicted values of the data point for one or multiple times in the future (the sequence 408), and the predicted values of the data point fed back into the decoder 404 (the sequence 412). As illustrated by FIG. 4, the input to layer 424 is the value "X" of the sequence 412 which is the output of the layer 422. Similarly, the output of the layer 424, "Y," is the input to the layer 426. Furthermore, the output of the layer 426, "Z," is the input of the layer 428. The data point can be a control point, an ambient condition data point (e.g., outdoor air temperature, humidity, air quality, etc.), energy usage of a campus or building, etc.

Figure 5:
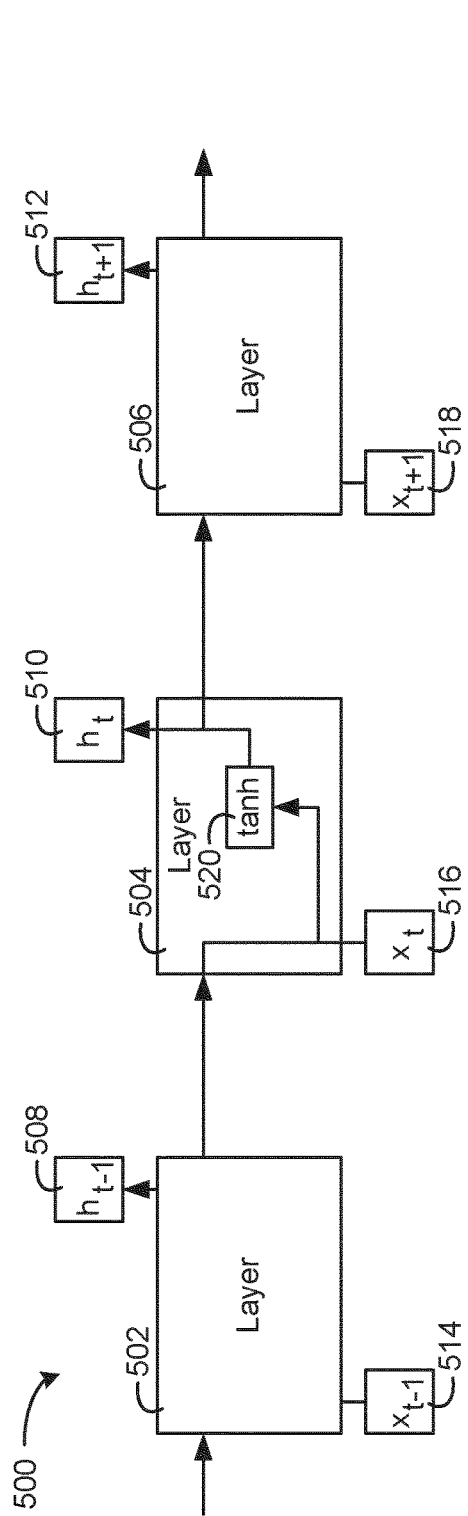
FIG. 5 is a block diagram of layers of a recurrent neural network, according to an exemplary embodiment.

Referring now to FIG. 5, layers of a RNN 500 are shown, according to an exemplary embodiment. The RNN 500 includes layers 502-506. The architecture of each of the layers 502-506 may be the same. The architecture is illustrated by the layer 504. Each of the layers 502-506 may receive an input, i.e., inputs 514-518 while each of the layers 502-506 can also generate an output 508-512. Each of the layers 502-506 may be chained together such that the output of each layer is fed into the next layer. In layer 504, the output of the layer 502 (the output 508) is fed into the layer 504 and is concatenated with the input 516. The result of the concatenation is passed through a tanh activation 520 which is subsequently passed out of the layer 504 to the layer 506, i.e., the output 510.

The architecture of the layers 502-506 allow for the RNN 500 to have memory, i.e., have persistence of outputs. However, while the RNN 500 may include memory, the memory may not be long term, i.e., the RNN 500 suffers from the vanishing gradient problem and encounters difficulty in learning long term. To address the effects of long term memory, an LSTM can be utilized.

Figure 6:
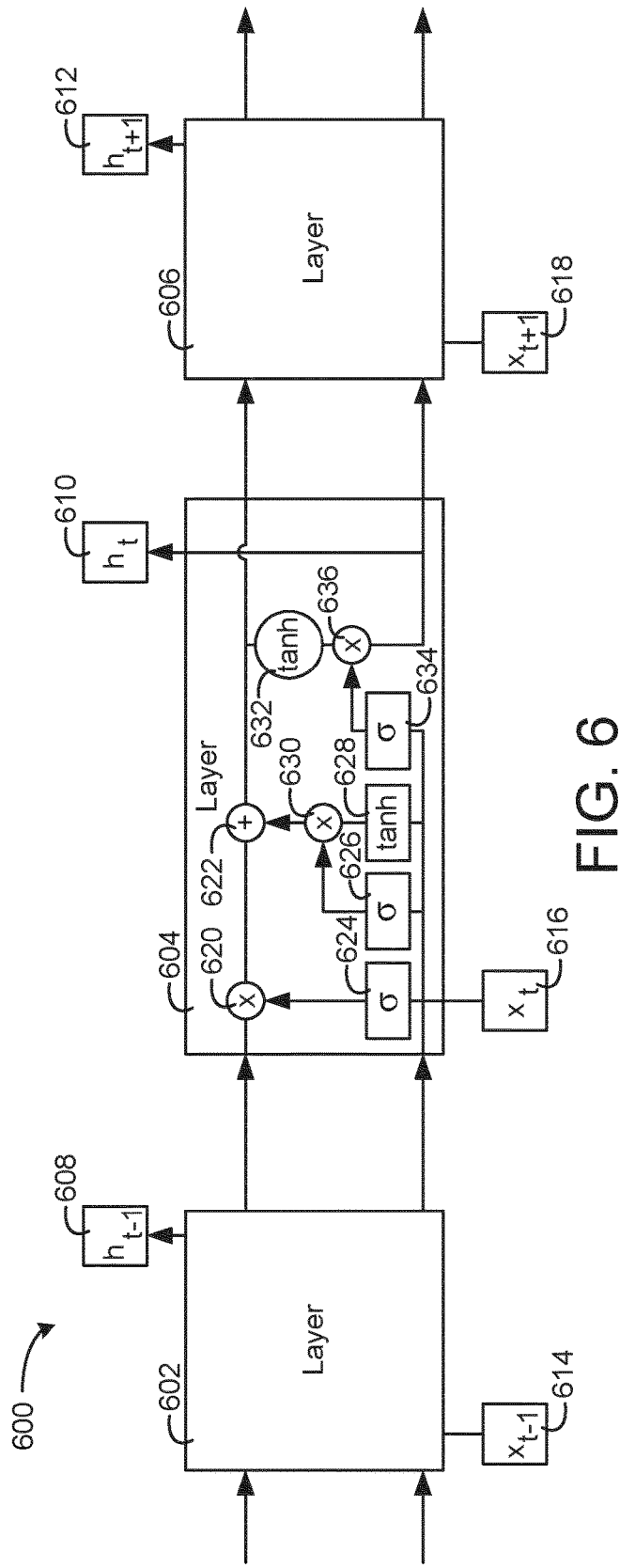
FIG. 6 is a block diagram of layers of a long-short term memory neural network, according to an exemplary embodiment.

FIG. 6 is a block diagram of layers of a LSTM neural network 600, according to an exemplary embodiment. The LSTM neural network 600 includes layers 602-606. The architecture of each of the layers 602-606 may be the same. The architecture is illustrated by the layer 604. Each of the layers 602-606 may receive an input, i.e., inputs 614-618 while each of the layers 502-506 can also generate an output 608-612. Each of the layers 602-606 may be chained together such that the outputs of each layer is fed into the next layer. The layer 604 can include neural network layers 624, 626, 628, and 634 which are shown as tanh and sigmoid activations respectively. Furthermore, the layer 604 includes pointwise operations 620, 622, 630, 632, and 636 which represent multiplication, addition, and tanh variously. Where multiple lines between layers come together in the layer 604 represents concatenation. Greater details on RNN and LSTM networks and layer construction can be found in the publication "Understanding LSTM Networks" by Christopher Olah published on Aug. 27, 2015, the entirety of which is incorporated by reference herein.

Referring now to FIGS. 7 and 8, an LSTM S2S neural network 700 for energy forecasting is shown during a training phase and an inference phase, according to an exemplary embodiment. The LSTM S2S 700 may be the same as or similar to the LSTM S2S 400 described with reference to FIG. 4. More particularly, the LSTM S2S neural network 700 includes an encoder 708, a decoder 710, an input sequence 702 to the encoder 708, an output sequence 704 of the decoder 710, and a feedback sequence to the decoder 710. The output of decoder 710 at each time-step can be a point-forecast of energy.

During the training phase, the feedback is actual known values of energy that the LSTM S2S 700 is attempting to predict, i.e., the sequence 706. More specifically, during the training phase, the point-forecast of the LSTM S2S 700 is ignored, and actual energy is fed back into the decoder 710 in next time-step to generate point-forecast in that time-step. During the inference phase, the feedback is the predicted energy values that the LSTM S2S 700 has predicted, i.e., the sequence 800. More specifically, during inference, this point-forecast is fed back into decoder in next time-step to generate point-forecast in that time-step Referring more particularly to FIG. 7, the LSTM S2S neural network 700, during the training phase, generates an energy forecast for a building for four time-steps into the future, i.e., $\hat{E}_{t+1}$, $\hat{E}_{t+2}$, $\hat{E}_{t+3}$, and $\hat{E}_{t+4}$, i.e., the elements of the output sequence 704 based on a current energy value and three historical energy values three time-steps prior to the current energy value, i.e., $E_{t-3}$, $E_{t-2}$, $E_{t-1}$, and $E_{t-1}$, the sequence 702. Because the current phase is the training phase, the LSTM S2S neural network 700 is trained based on known training data and thus the actual energy values that the LSTM S2S neural network 700 is attempting to predict are known. In this regard, the known values are fed into the decoder 710 as the sequence 706, i.e., $E_{t+1}$, $E_{t+2}$, and $E_{t+3}$.

Referring more particularly to FIG. 8, the LSTM S2S neural network 700, during the inference phase, generates an energy forecast for a building for use in operating equipment of a building or providing metrics to a user. Rather than using known actual values of the energy as feedback into the decoder 710, the predicted values, the sequence 704, is fed back into the decoder 710 as the sequence 800, i.e., $\hat{E}_{t+1}$, $\hat{E}_{t+2}$, and $\hat{E}_{t+3}$.

Figure 9:
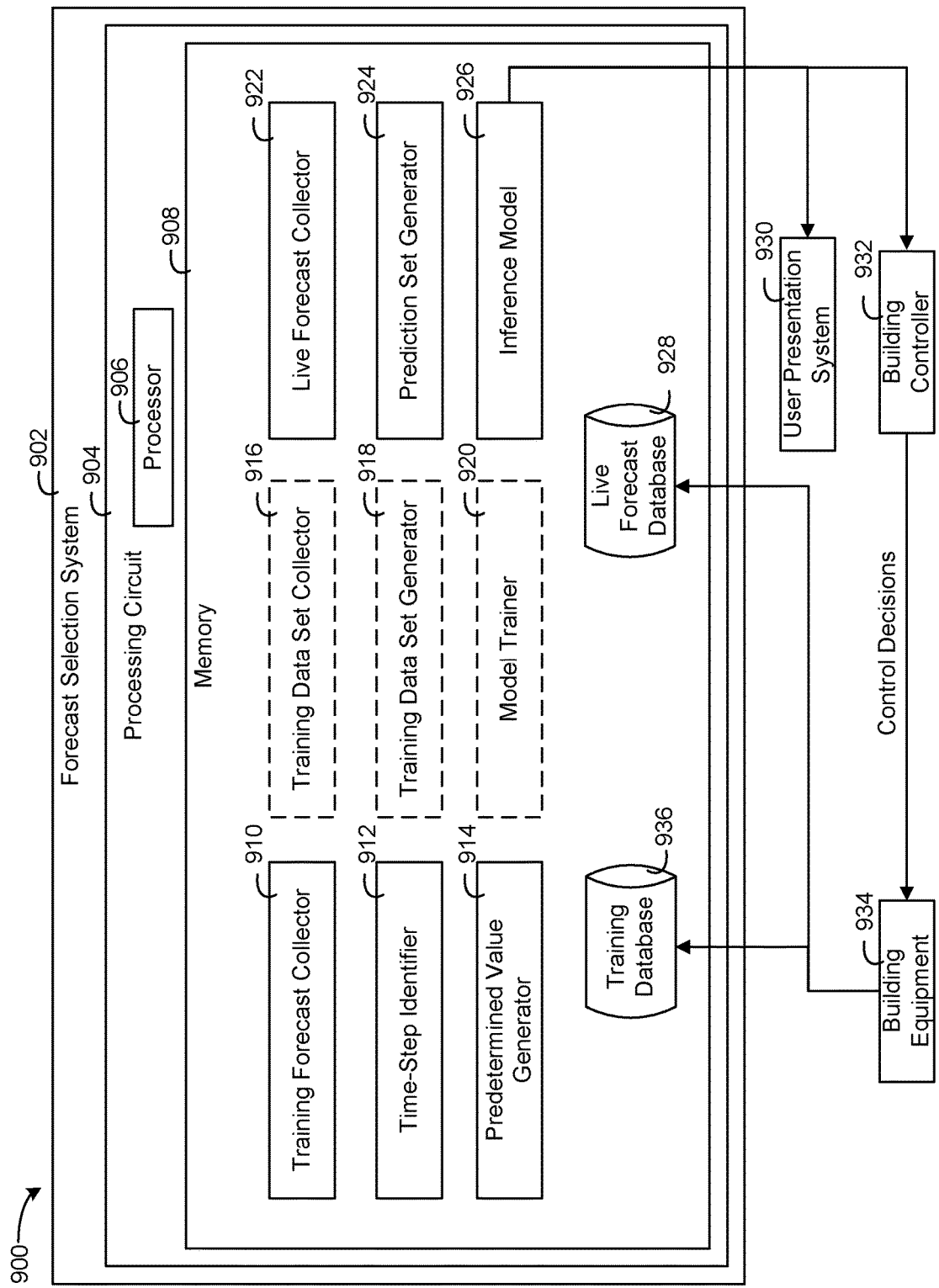
FIG. 9 is a block diagram of a forecast selection system that determines which forecasts to use and forecasts for which to provide predetermined values as input into an inference model, according to an exemplary embodiment.

Selective Use of Data for Probabilistic Data Point Forecasting and Model Training Referring now to FIG. 9, a block diagram of a system 900 including a forecast selection system 902 that determines which forecasts (e.g., predicted values of a point of the building system) to use and forecasts for which to provide predetermined values is shown, according to an exemplary embodiment. Forecast selection system 902 may train a prediction model to handle data that includes the predetermined values. In addition to forecast selection system 902, system 900 is shown to include a user presentation system 930, a building controller 932, and building equipment 934. Each of components 902 and 924-928 may communicate over a network.

Forecast selection system 902 may include a processing circuit 904, a processor 906, and a memory 908. Processor circuit 904, processor 906, and/or memory 908 can be the same as, or similar to, processing circuit 204, processor 206, and/or memory 208 as described with reference to FIG. 2. Memory 908 is shown to include a training forecast collector 910, a time-step identifier 912, a predetermined value generator 914, a live forecast collector 922, a prediction set generator 924, an inference model 926, a live forecast database 928, and a training database 936, in some embodiments. In some embodiments, memory 908 may also include, or may instead include, a training data set collector 916, training data set generator 918, and model trainer 920. Memory 908 may include any number of components. In brief overview, forecast selection system 902 may be configured to receive training data including previous forecasts (e.g., predicted values) of a data point of a building system (or a BMS) for various time-steps and corresponding actual (e.g., realized) values at the same time-steps. Based on the training data, forecast selection system 902 may identify time-steps that are associated with inaccurate data. Forecast selection system 902 may receive live data including forecasts for various time-steps and replace data associated with the identified time-steps with a predetermined value to obtain an updated prediction data set. Forecast selection system 902 may input the updated prediction data set into an inference model (e.g., inference model 926) to predict an expected energy output for future time-steps. Forecast selection system 902 may provide the expected energy output to a building controller (e.g., building controller 932) to control building equipment (e.g., building equipment 934) of a building system.

Training forecast collector 910 can include instructions performed by one or more servers or processors (e.g., processing circuit 904), in some embodiments. In some embodiments, training forecast collector 910 may be configured to collect training data from training database 936 and generate a training dataset based on the training data. The training data may include data from one more data source providers. The data source providers may be internal to a building system that forecast selection system 902 is associated with or external to the building system. For example, the data source providers may be an internal weather service, data sensors of the building system, an external weather service, etc. The training data may include forecast data associated with a data point of the building system. For example, the data source provider may be an external domain (e.g., an external source) that continuously provides outside air temperature forecasts for an area associated with the building system. The outside air temperature forecasts may include a predicted outside air temperature for various hours into the future (e.g., at hourly horizons). The outside air temperature forecasts can be for any interval. The intervals may be random or pseudo-random. A server associated with the domain may provide the outside air temperature forecasts to forecast selection system 902 so forecast selection system 902 can use the forecasts to predict how much energy the building management system will likely use for each hour of a number of hours into the future (e.g., at hourly horizons). As described herein, the forecasts and the associated values may also be called predictions.

The data points of the training data can include data for any data point of a building system that may be related to various other data points of the building system. For instance, the data points may be related to an amount of energy that the building system uses. For example, the data points may include, but are not limited to, outside air temperature, energy load, plug load schedule, light load schedule, occupancy, scheduling information, etc. Outside air temperature may be relevant to how much energy the building system uses because, for example, if it is hot outside, the building system may use energy to keep the inside of the building cool to an administrator-defined level. Energy load may be relevant to how much energy a building system uses because, for example, it may indicate how much energy various devices of the building system use at various times during the day. Occupancy may be relevant to how much energy the building system uses because, for example, if more people are in a building, the HVAC system may work harder (e.g., spin fans faster, provide more air, etc.) to keep the building system cool. Further, more occupants may mean more lights may be turned on, consequently the building system may use more energy to power the lights.

Finally, scheduling information may be relevant to how much energy the building system uses because, for example, specific events may cause more or less energy to be used by the building system. For example, if a building system is a sports arena and a basketball game is scheduled for 7:00 PM-10:00 PM, more energy may be used to keep the sports arena inhabitable for players playing the basketball game and anyone in the audience between 7:00 PM and 10:00 PM than at times during the day when the sports arena is not in use. Another example of scheduling information is a scheduled time frame where the HVAC of a building system is scheduled to cool the building for one or more hours. Such information may indicate that energy will be used by the HVAC system of the building system to keep the building cool during the one or more hours.

An internal data source provider or an external data source provider may provide forecasts for one or more data points indicating values to associate with the data points at various time-steps. For example, an internal service to the building system may forecasts indicating that the outside air temperature of a building system will be 70 degrees one hour from the time the forecast was made, 72 degrees two hours from the time the forecast was made, 73 degrees three hours from the time the forecast was made, and 72 degrees four hours from the time the forecast was made. The internal service may provide values for any number of time-steps. An external service may provide similar forecasts. As described in greater detail below, forecast selection system 902 may use such forecasts to predict how much energy the building system will use at each of the time-steps.

From data in training database 936, training forecast collector 910 may identify previous forecasts that a source has made along with the actual data that corresponds to the previous forecasts. For example, training forecast collector 910 may identify an outside air temperature forecast data set that includes outside air temperatures forecasts made by a service that is internal to a building system. The service may have made the forecasts two weeks prior to when training forecast collector 910 identified the data. The outside air temperature forecasts may include forecasts five hours into the future from when the forecasts were made. Training forecast collector 910 may also identify the actual outside air temperature associated with the same time-steps (e.g., times) as the predicted outside air temperature. Training forecast collector 910 may be configured to generate a training data set including the previous forecast outside air temperatures and the actual outside air temperatures (e.g., for supervised training). In some embodiments, training forecast collector 910 may be configured to generate the training data set by generating a feature vector including the data to input into a machine learning model for training.

Training database 936 can be a dynamic database including data inputs that training database 936 receives from building equipment 934 and from various other sources (e.g., data source providers). Training database 936 can be a graph database, MySQL, Oracle, Microsoft SQL, PostgreSql, DB2, document store, search engine, key-value store, etc. Training database 936 may be configured to hold any amount of data and can be made up of any number of components, in some embodiments. Training database 936 may be configured to store training data that includes forecasts from various internal and/or external data source providers that predict, or provide, values for data points for various time-steps into the future (e.g., future from when the forecast was made). Training database 936 may be configured to include forecasts values for any number of data points of the building system. For example, training database 936 may be configured to include forecasts values associated with outside air temperature, discharge air temperature, mixed air temperature, space temperature, duct static pressure, building static pressure, supply fan start/stop & status, supply fan status, return fan status, etc.

Training database 936 may also be configured to include actual values for the various time-steps and data points. Training database 936 may receive the actual values from the same source provider that made the forecasts or from a different data source providers. In some instances, training database 936 may include values associated with the data points as time-series data. In some instances, training database 936 may be configured to include forecasts values that were previously input into inference model 926 and corresponding actual values. Training forecast collector 910 may be configured to retrieve data from training database 936 and generate labeled training data that includes forecast values associated with forecasts that a source made and values indicating what the actual values were for the same data point and time-step. Training database 936 can hold any amount of forecast data. Forecasts can be added or removed from training database 936 at any time.

Further, training database 936 may also be configured to include training data sets that can be used to train and generate inference model 926. The training data sets may include forecast data values for various points of the building system at various time-steps and realized values of other data points, including energy consumption, in some cases, at the same time-steps. As described herein, realized values may be the actual values of a point at a given time or time-step. Training data set collector 916 may be configured to retrieve such training data sets so training data set generator 918 may be configured to generate an augmented training data set, as described below, that can handle forecast data that includes various amounts of predetermined values.

As the building system operates, training data sets may be added to training database 936 that can be used to train inference model 926.

Time-step identifier 912 can include instructions performed by one or more servers or processors (e.g., processing circuit 904), in some embodiments. In some embodiments, time-step identifier 912 may be configured to identify time-steps for which a data source provider has previously or generally does not supply accurate data. Time-step identifier 912 may be configured to identify training data sets that training forecast collector 910 supplies. As described above, the training data sets may include forecast values of a data point for various time-steps and actual values of the data point for the corresponding time-steps. As described below in greater detail, from the training data set, time-step identifier 912 may be configured to identify time-steps for which a data source provider that provided data of the training data set has, and may in the future, provided inaccurate data.

To identify time-steps for which the data source provider may provide inaccurate data, time-step identifier 912 may be configured to determine a CV-RMSE value for each time-step of a training data set associated with the data source provider. The CV-RMSE value may be the coefficient of variation of the root-mean-square deviation of the time-step. To determine the CV-RMSE value, time-step identifier 912 may determine the RMSE value of each time-step using the following equation:

$$RMSE = \sqrt{\frac{\sum_{t=1}^{T} (\hat{X}_{oat,t+1} - X_{oat,t+1})^2}{T}}$$

T may be the total number of time-steps for which the data source provider has provided a forecast, $\hat{X}_{oat,t+1}$ may be the forecast value of the outside air temperature at time-step, t+1 (e.g., one hour from the time the forecast was made). $X_{oat,t+1}$ may be the actual value of the outside air-temperature at time-step, t+1. Time-step identifier 912 may be configured to determine the CV-RMSE value based on the determined RMSE value using the following equation:

$$CVRMSE = \frac{RMSE}{\bar{y}} * 100\%$$

$\bar{y}$ may be an average value of the actual measurements. CVRMSE may be the CV-RMSE value of the time-step associated with the RMSE value. It should be understand that the outside air temperature is an example. Time-step identifier 912 may determine RMSE and CVRMSE values and otherwise perform the processes described herein for forecast values of any data point.

Time-step identifier 912 may be configured to determine time-steps that are associated with inaccurate data by comparing the determined CV-RMSE (or RMSE) value of each time-step to a predetermined threshold. An administrator may set the predetermined threshold. The predetermined threshold may be specific to each time-step. For example, the predetermined threshold may be lower for a time-step associated with a one hour time-step (e.g., one hour from the time the forecast was made) than for a time-step associated with a three hour time-step (e.g., three hours from the time the forecast was made). In embodiments, if time-step identifier 912 identifies one time-step that is associated with inaccurate data, time-step identifier 912 may be configured to automatically associate each subsequent time-step with inaccurate data as well to save processing time and avoid determining CV-RMSE or RMSE values for each of the later time-steps. In some embodiments, the time-steps that time-step identifier 912 identifies as being inaccurate may be specific to a data point. For example, time-step identifier 912 may identify occupancy data from a data source provider at the one hour time-step as being inaccurate. Time-step identifier 912 may identify outside air temperature data from the same source provider as being accurate.

In some embodiments, time-step identifier 912 may be configured to compare the forecast value of each time-step to a corresponding actual value. Time-step identifier 912 may be configured to determine a difference between the forecast value and the actual value and compare the difference to a threshold, which may be specific to each time-step. Similar to above, if the difference exceeds the threshold, time-step identifier 912 may be configured to determine that time-steps associated with differences that exceed an associated threshold may be inaccurate.

Advantageously, by utilizing thresholds that are specific to each time-step, time-step identifier 912 may account for more unpredictable conditions and randomness in the future in determining whether a data source provider is accurate for various time-steps. For example, a data source provider may more easily predict what the outside air temperature is one hour in advance versus six hours in advance because there is less time for intervening events that could affect the actual value (e.g., a sudden storm, rain, snow, clouds, etc.) for the one hour forecast. Because an administrator may not wish to identify a data source provider as providing inaccurate data for time-steps that are well into the future simply because there is more time for intervening events to make the forecast s inaccurate, the administrator may provide a bigger inaccuracy range for time-steps that are further in the future from the time the forecast was made than time-steps that are close to the time the forecast was made. Consequently, by being able to implement thresholds that are unique to each time-step, an administrator may have more control over how time-step identifier 912 identifies time-steps for which data source providers provide inaccurate data.

In some embodiments, instead of determining and comparing CV-RMSE values of each time-step to a threshold, time-step identifier 912 may be configured to determine a CUSUM value of each time-step and compare the CUSUM value to a predetermined threshold. The CUSUM value may be a cumulative sum of differences between the forecast values provided by a data source provider and the actual values. As with the predetermined thresholds associated with the RMSE values, the predetermined values associated with the CUSUM values may be individually associated with each time-step to account for likely inaccuracies for later time-steps. To determine the CUSUM values for each time-step, time-step identifier 912 may be configured to determine a change in CV-RMSE values between each time-step using the following formula:

$$\Delta C_t = C_t - C_{t-1}$$

$\Delta C_t$ may be a change in CV-RMSE values between the time-step at time, t, and a previous time-step at time, t−1, $C_t$ may be a CV-RMSE value at a time-step at time, t. $C_{t-1}$ may be a CV-RMSE value at time-step previous to $C_t$. Time-step identifier 912 may be configured to then determine the CUSUM value for each time-step using the following formula:

$$S_t = \max(0, S_{t-1} + \Delta C_t)$$

T may be the total number of time-steps for which the data source provider has provided forecasts, $S_t$ may be the CUSUM value of the time-step at time, t. $S_{t-1}$ may be the CUSUM value at the time-step previous to the time-step of $S_t$ at time, t−1.

Time-step identifier 912 may be configured to determine the CUSUM value for each time-step of training data that training forecast collector 910 provides and compare the CUSUM value to a predetermined threshold. Time-step identifier 912 may be configured to identify time-steps with CUSUM values that are above the predetermined threshold as being inaccurate. Consequently, predetermined value generator 914 may be configured to assign (e.g., label or tag) a predetermined value (e.g., a dummy variable) to the time-step to indicate for forecast selection system 902 to avoid using data associated with the time-step that forecast selection system 902 receives from the same data source provider. Otherwise, the dummy variable may indicate for forecast selection system 902 to treat the values associated with the identified time-step differently when generating forecasts for future values of data points.

In some embodiments, a third party may identify time-steps that are associated with inaccurate data. The third party may identify the time-steps by performing the processes described herein or through any other method. The third party may send an indicator to forecast selection system 902 indicating which time-steps may be associated with inaccurate data. Time-step identifier 912 may identify the indicated time-steps as time-steps that are associated with inaccurate data from the indicator. For example, in some embodiments, a third party, such as a data storage/management service or platform, may perform steps 1202, 1204, and 1206 of method 1200 to determine the time-steps and send an identification of the time-steps to the building system. In other embodiments, the third party may perform more, fewer, or different steps of method 1200. All such embodiments are contemplated within the scope of the present disclosure.

Predetermined value generator 914 can include instructions performed by one or more servers or processors (e.g., processing circuit 904), in some embodiments. In some embodiments, predetermined value generator 914 may be configured to associate predetermined values with time-steps for which a data source provider has provided inaccurate data to a predetermined threshold. Predetermined value generator 914 may be configured to identify the time-steps that time-step identifier 912 determined to be inaccurate and label, or tag, the time-steps with an indicator indicating for forecast selection system 902 to avoid using data associated with the labeled time-step when using forecasts from the same data source provider to predict a total energy consumption of the building system at various time-steps. The label may be a binary value (e.g., a one indicating that the data source provider may provide accurate data for the time-step and a zero indicating that the data source provider may provide inaccurate data for the time-step).

Training data set collector 916 can include instructions performed by one or more servers or processors (e.g., processing circuit 904), in some embodiments. In some embodiments, training data set collector 916 may be configured to collect training data that can be used to train and generate inference model 926 to use forecast data that has been modified to include predetermined values at various time-steps instead of the forecast value. Training data set collector 916 may be configured to retrieve training data sets from training database 936. As described above, the training data sets may include forecast values of a point (e.g., outside air temperature, occupancy, plug load schedule, light load schedule, energy load, scheduling information, etc.) at various time-steps and realized values related to other points including the energy output at each of the time-steps. The training data may include realized values related to an energy output point of the building system and another point. An example of a training data set is shown below:

$\{X_{non-oat}, \{\hat{X}_{oat,t+1}, \hat{X}_{oat,t+2}, \ldots, \hat{X}_{oat,t+N}\}\}, \{E_{t+1}, E_{t+2}, \ldots, E_{t+N}\}$ $X_{non-oat}$ may be the value of non-outside air temperature points and may represent any number of values for time-steps and values for any number of points. $\hat{X}_{oat,t+1}$ may be the forecast value at time-step, t+1 (e.g., one hour into the future from the time the forecast was made). $E_{t+1}$ may be the realized energy output of the building system at time-step, t+1.

In some embodiments, training data set collector 916 may be configured to collect forecast data sets that are provided by an external or internal data source provider. The forecast data sets may include forecast values of a point at various time-steps. Training data set collector 916 may also be configured to collect realized value of other points including the energy output point. Training data set collector 916 may be configured to combine the forecast data set and the collected realized values and either store them in training database 936 as a training data set or provide them to training data set generator 918.

Training data set generator 918 can include instructions performed by one or more servers or processors (e.g., processing circuit 904), in some embodiments. In some embodiments, training data set generator 918 may be configured to generate an augmented training data set to train and generate inference model 926. Training data set generator 918 may receive the training data sets that training data set collector 916 collects and generate an augmented training data set for each training data set. To do so, for each training data set (e.g., original training set), training data set generator 918 may be configured to generate an augmented training data set that includes multiple second training data sets that include the same values as the original training data set. Training data set generator 918 may be configured to generate a number of second training data sets that is equal to the number of forecast data values of the original training data set. Each of the generated second training data sets may include the same forecast values for a point and realized values for one or more other points. Training data set generator 918 may be configured to generate any number of training data sets.

For each training data set that training data set generator 918 generates, training data set generator 918 may be configured to replace at least one forecast value with a predetermined value. In some embodiments, for a second training data set, training data set generator 918 may be configured to replace the forecast value associated with the last time-step of the second training data set with the predetermined value. For another second training data set, training data set generator 918 may be configured to replace forecast values that are associated with the last two time-steps of the second training data set. For the second training data sets, training data set generator 918 may be configured to progressively replace forecast values associated with the last time-steps for each time-step of the second training data set until training data set generator 918 replaces each forecast value of a second training data set with a predetermined value.

For example, training data set generator 918 may receive an original training data set from training data set collector 916. The original training data set may be of the form:

$X_i^0 = \{X_{non-oat}, \{\hat{X}_{oat,t+1}, \ldots, \hat{X}_{oat,t+2}, \hat{X}_{oat,t+N}\}\}, \{E_{t+1}, E_{t+2}, \ldots, E_{t+N}\}$ as described above. Training data set generator 918 may generate second training data sets of the form:

$X_i^1 = \{X_{non-oat}, \{\hat{X}_{oat,t+1}, \ldots, \hat{X}_{oat,t+N-1}, \hat{X}_{oat,t+N}=d\}\}, \{E_{t+1}, E_{t+2}, \ldots, E_{t+N}\}$, $X_i^2 = \{X_{non-oat}, \{\hat{X}_{oat,t+1}, \ldots, \hat{X}_{oat,t+N-1}=d, \hat{X}_{oat,t+N}=d\}\}, \{E_{t+1}, E_{t+2}, \ldots, E_{t+N}\}$ $X_i^3 = \{X_{non-oat}, \{\hat{X}_{oat,t+1}=d, \ldots, \hat{X}_{oat,t+N-1}=d, \hat{X}_{oat,t+N}=d\}\}, \{E_{t+1}, E_{t+2}, \ldots, E_{t+N}\}$ $X_i^1$, $X_i^2$, and $X_i^3$ may each be second training data sets that training data set generator 918 generated for an outside air temperature point based off the original training data set. N of t+N may indicate a time-step (e.g., hour from the time the forecast was made). d may be a predetermined value (e.g., a dummy value).

In $X_i^1$, each of the forecast values may the same as in the original data set $X_i^0$. However, the last forecast value, $\hat{X}_{oat,t+N}$, (e.g., the forecast value associated with the last time-step) of $X_i^1$ may be replaced with the predetermined value. In $X_i^2$, the forecast values associated with the last two time-steps may be replaced with the predetermined value. In $X_i^3$, the forecast values associated with all of the time-steps may be replaced with the predetermined value. Training data set generator 918 may be configured to generate any number of second training data sets for an augmented training data set and may replace any number of forecast values of each second training data set with the predetermined value. Training data set generator 918 may be configured to generate augmented training data sets for any number of data points. Training data set generator 918 may be configured to store the augmented training data sets in training database 936.

In some embodiments, in addition to the second training data sets, training data set generator 918 may be configured to generate an indicator training data set for each training data set and, in some cases, the original training data set. The indicator training data set may be a vector or an array and include a binary value for each index value of the vector or array. The index values may correspond to a time-step of an associated second training data set or original training data set. The binary value of an index value may indicate whether an associated time-step of an associated second training data set has been replaced with the predetermined value. For example if a second training data set includes the following values:

$\{\hat{X}_{oat,t+1}, \ldots, \hat{X}_{oat,t+N-1}, \hat{X}_{oat,t+N}=d\}$ an indicator vector associated with the second training data set may include the following values:

$\{1, \ldots, 1, 0\}$

As shown, the forecast values that remain of the second training data set may be associated with a one in the indicator vector while the forecast values that were replaced may be associated with a zero. Training data set generator 918 may be configured to generate an indicator vector for the original training data and each second training data set and include each indicator vector in the augmented training data set.

Model trainer 920 can include instructions performed by one or more servers or processors (e.g., processing circuit 904), in some embodiments. In some embodiments, model trainer 920 is configured to use the augmented training data sets that training data set generator 918 generates to train and generate a prediction model (e.g., inference model 926).

Model trainer 920 may be configured to retrieve the augmented training data sets that training data set generator 918 generates and input them into inference model 926. Model trainer 920 may be configured to generate a probabilistic output for a point at various time-steps indicating probabilities for various values of the point at the various time-steps. The augmented training data sets may include the actual values of the point for each time-step for which the prediction model generates predictions. Inference model 926 may be configured to compare the generated probabilities with the actual values and adjust its own internal weights and processes based on any identified differences in the data. Consequently, inference model 926 may be trained in a supervised system. Inference model 926 may also be trained in a semi-supervised and un-supervised system with training data sets that do not include realized values of data points or only partially include realized values of data points, respectively.

For each augmented training data set, model trainer 920 may be configured to compare the predicted probabilities with the actual values and determine an accuracy percentage. Model trainer 920 may be configured to compare the accuracy percentage to a threshold, as set by an administrator, to determine if inference model 926 is generating accurate probabilities. If model trainer 920 determines that inference model 926 is accurate above the threshold, inference model 926 may be trained (e.g., generated) and used to predict values for points at various time-steps. However, if model trainer 920 determines that inference model 926 is not accurate above the threshold, model trainer 920 may be configured to continue to apply augmented training data to inference model 926 until inference model 926 is accurate above the threshold. In some instances, model trainer 920 may apply non-augmented training data to inference model 926 for training. Finally, in some instances, model trainer 920 may be configured to apply predicted data sets and, in some cases, realized values associated with the predicted data sets to inference model 926 for training.

Live forecast collector 922 can include instructions performed by one or more servers or processors (e.g., processing circuit 904), in some embodiments. In some embodiments, live forecast collector 922 may be configured to collect live forecasts (e.g., prediction values of a data point at various time-steps) from a data source provider to provide into inference model 926 to predict how much energy the building system may use at various time-steps in the future. Live forecast collector 922 may be configured to collect the live forecasts from the data source provider, building equipment 934, or from live forecast database 928. Once live forecast collector 922 collects the live forecasts, prediction set generator 924 may generate a prediction data set based on the live forecasts and based on the time-steps that predetermined value generator 914 labeled as being associated with inaccurate data, as described below.

Live forecast database 928 can be a dynamic database including data inputs that live forecast database 928 receives from building equipment 934 or various data source providers. Live forecast database 928 can be a graph database, MySQL, Oracle, Microsoft SQL, PostgreSql, DB2, document store, search engine, key-value store, etc. Live forecast database 928 may be configured to hold any amount of data and can be made up of any number of components, in some embodiments. Live forecast database 928 may be configured to store live data that includes data from various internal and/or external data source providers that provide forecast values for data points for various time-steps into the future. Prediction set generator 924 may be configured to use the live data to generate a prediction data set. Live forecast database 928 may be configured to hold any amount of prediction data. Predictions or forecasts can be added or removed from training database 936 at any time.

Prediction set generator 924 can include instructions performed by one or more servers or processors (e.g., processing circuit 904), in some embodiments. In some embodiments, prediction set generator 924 may be configured to generate prediction data sets to input into inference model 926. Prediction set generator 924 may be configured to generate the prediction data sets using the forecast s that live forecast collector 922 collected. In some embodiments, the data is labeled (e.g., in a header of the data) with the data source provider that provided the data. Prediction set generator 924 may be configured to identify the data source provider of the data from the label and identify which time-steps are associated with labels indicating that the data source provider may provide inaccurate data for the time-step. In some embodiments, only one data source provider provides data to forecast selection system 902. Prediction set generator 924 may be configured to identify time-steps for which the data source provider provides inaccurate data without identifying the data source provider from a label.

Prediction set generator 924 may receive a data set including forecast values of a data point (e.g., an outside air temperature point, an occupancy point, an energy load point, scheduling information, etc.). The prediction data set may include forecast values for various time-steps into the future. For each time-step, prediction set generator 924 may be configured to determine whether the time-step is associated with an inaccurate data label. Prediction set generator 924 may do so by analyzing the time-step to identify if there is an inaccurate data label associated with it. If prediction set generator 924 identifies an inaccurate data label associated with a time-step, prediction set generator 924 may be configured to replace the value associated with the time-step with a predetermined value. Prediction set generator 924 may be configured to repeat these steps for each time-step of a data set to generate an updated prediction data set. Prediction set generator 924 may be configured to replace the value associated with any number of time-steps with the predetermined value. Prediction set generator 924 may be configured to provide the updated prediction data set to inference model 926. In some embodiments, the updated prediction data set may be a feature vector having a size equal to the number of time-steps for which prediction set generator 924 received data.

The predetermined value may be an arbitrary value that indicates for inference model 926 to avoid using data associated with a time-step associated with the predetermined value. The predetermined value may be the same for each time-step to which it is input. For example, prediction set generator 924 may be configured to set the predetermined value to be zero if inference model 926 is a neural network. Consequently, the input associated with the predetermined value may not be used by the neural network to determine energy forecasts for various time-steps. The predetermined value may be any value.

In some embodiments, prediction set generator 924 may also be configured to generate a second data set (e.g., an indicator data set) indicating index values or time-steps of the updated prediction data set that are associated with a predetermined value. Prediction set generator 924 may be configured to generate the second data set by creating a vector having binary values having a same length as the updated prediction data set. The second data set may include zeros at index values that are equal to index values of the updated prediction data set (e.g., associated with the same time-step) that are associated with the predetermined value. The rest of the values of the second data set may be ones. In some embodiments, the ones and zeros may be reversed. Prediction set generator 924 may be configured to include the second data set with the updated prediction data set as input to inference model 926.

Inference model 926 can include instructions performed by one or more servers or processors (e.g., processing circuit 904), in some embodiments. In some embodiments, inference model 926 may be configured to predict a total amount of energy (e.g., an energy forecast) that the building system may use at various time-steps in the future based on the input data that inference model 926 receives from prediction set generator 924. Inference model 926 may include one or more learning models that can generate probability distributions indicating probabilities for amounts of energy that the building system may use at a given time-step. Inference model 926 may provide the generated probability distributions to building controller 932 and/or to user presentation system 930 to control building equipment 934 and/or to be displayed at a user device. Inference model 926 may be a neural network, an LSTM S2S neural network (e.g., LSTM S2S neural network 400), Random Forest, a support vector machine, etc.

Forecast selection system 902 can provide expected energy outputs to user presentation system 930 and/or building controller 932. In some embodiments, building controller 932 uses the expected energy outputs to operate building equipment 934 (e.g., control environmental conditions of a building, cause generators to turn on or off, charge or discharge batteries, etc.). Further, user presentation system 930 can receive the expected energy outputs and cause a client device to display indications (e.g., graphical elements, charts, words, numbers, etc.) of the expected energy output. For example, user presentation system 930 may receive expected energy output data for various future time-steps and display the expected energy output data at a client device. User presentation system 930 may display the expected energy output data through various charts and graphs.

Figure 10:
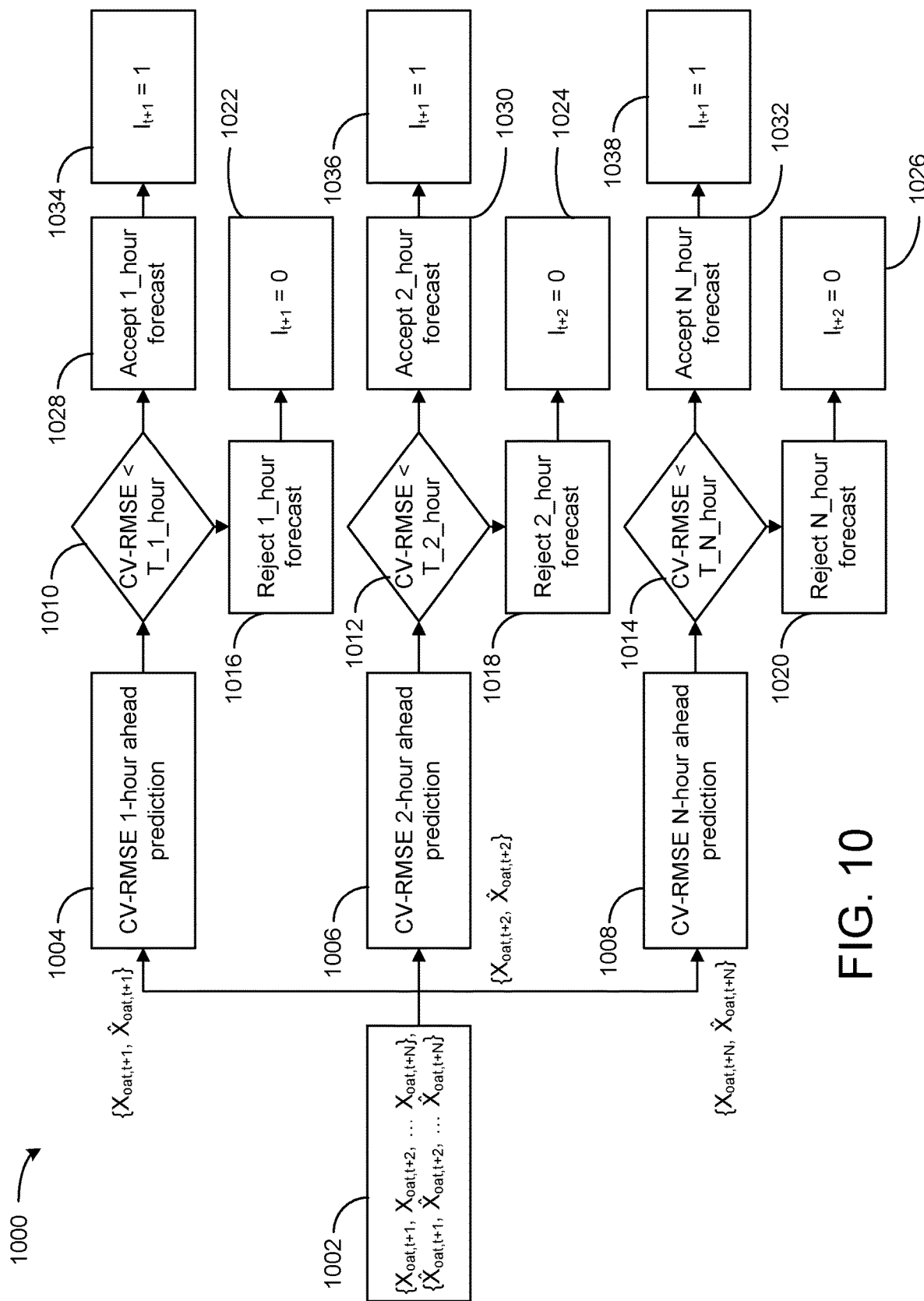
FIG. 10 is a flow diagram of a process for identifying time-steps to associate with predetermined values, according to an exemplary embodiment.

Referring now to FIG. 10, a flow diagram of a process 1000 for generating labels indicating for which forecasts to provide predetermined values is shown, according to an exemplary embodiment. Process 1000 may be performed by forecast selection system 902 or any other data processing system. Process 1000 may include any number of steps and the steps may be performed in any order. At a step 1002, forecast selection system 902 may receive training data from a data source provider. The training data may be in the form of:

$\{\hat{X}_{oat,t+1}, \hat{X}_{oat,t+2}, \ldots, \hat{X}_{oat,t+N}\}, \{X_{oat,t+1}, X_{oat,t+2}, \ldots, X_{oat,t+N}\}$ $\hat{X}$ may indicate a forecast value and X may indicate an actual value. Oat may indicate an outside air temperature. t+N may indicate a time, N, into the future from when the forecast was made (e.g., a time-step). For example, $\hat{X}_{oat,t+1}$ may indicate a forecast outside air temperature one hour into the future and $X_{oat,t+1}$ may indicate an actual (e.g., realized) outside air temperature one hour into the future. The forecast values and the actual values may be correlated so a forecast value may have a corresponding actual value at each time-step to which forecast selection system 902 can compare to determine an accuracy of the forecast values against the actual values. The values may be associated with any data point of a building system.

At steps 1004, 1006, and 1008, forecast selection system 902 may determine the CV-RMSE values of the forecasts at each time-step. In some embodiments, forecast selection system 902 also determines a CUSUM value at each time-step. Forecast selection system 902 may determine the CV-RMSE values or the CUSUM values at each time-step of the training data using the methods described above.

At steps 1010, 1012, and 1014, forecast selection system 902 may determine whether the CV-RMSE values or the CUSUM values exceed a threshold by comparing the respective values to the threshold. The threshold may be individually associated with each time-step and/or value type (e.g., RMSE value or CUSUM value). If forecast selection system 902 determines any of the values are below the associated threshold, at steps 1016, 1018, or 1020, forecast selection system 902 may reject the value that is associated with the RMSE value or the CUSUM value and, at steps 1022, 1024, or 1026, label the time-step associated with the forecast with an indicator indicating that the time-step is associated with inaccurate data.

For example, forecast selection system 902 may maintain indicators for various time-steps that are associated with forecasts of one or more data points (e.g., outside air temperature, occupancy, energy load, scheduling information, etc.). The indicators may include a binary value that indicates whether forecast selection system 902 may use data associated with the associated time-step based on the training data that forecast selection system 902 has received. If forecast selection system 902 receives training data and, at steps 1010, 1012, or 1020, identifies time-steps that are associated with inaccurate training data, forecast selection system 902 may, in some embodiments, mark the indicator associated with the identified time-step as being associated with inaccurate training data (e.g., as a zero in a binary labeling system).

If, at steps 1010, 1012, or 1014, forecast selection system 902 determines that the CV-RMSE value or the CUSUM value is above the associated threshold, at steps 1028, 1030, or 1032, forecast selection system 902 may accept the forecast at the associated time-step. Consequently, at steps 1034, 1036, or 1038, forecast selection system 902 may label the associated time-step as being associated with accurate data (e.g., as a one in a binary labeling system). Forecast selection system 902 may perform these steps for any number of time-steps and identify any number of time-steps as being associated with accurate or inaccurate data.

Figure 11:
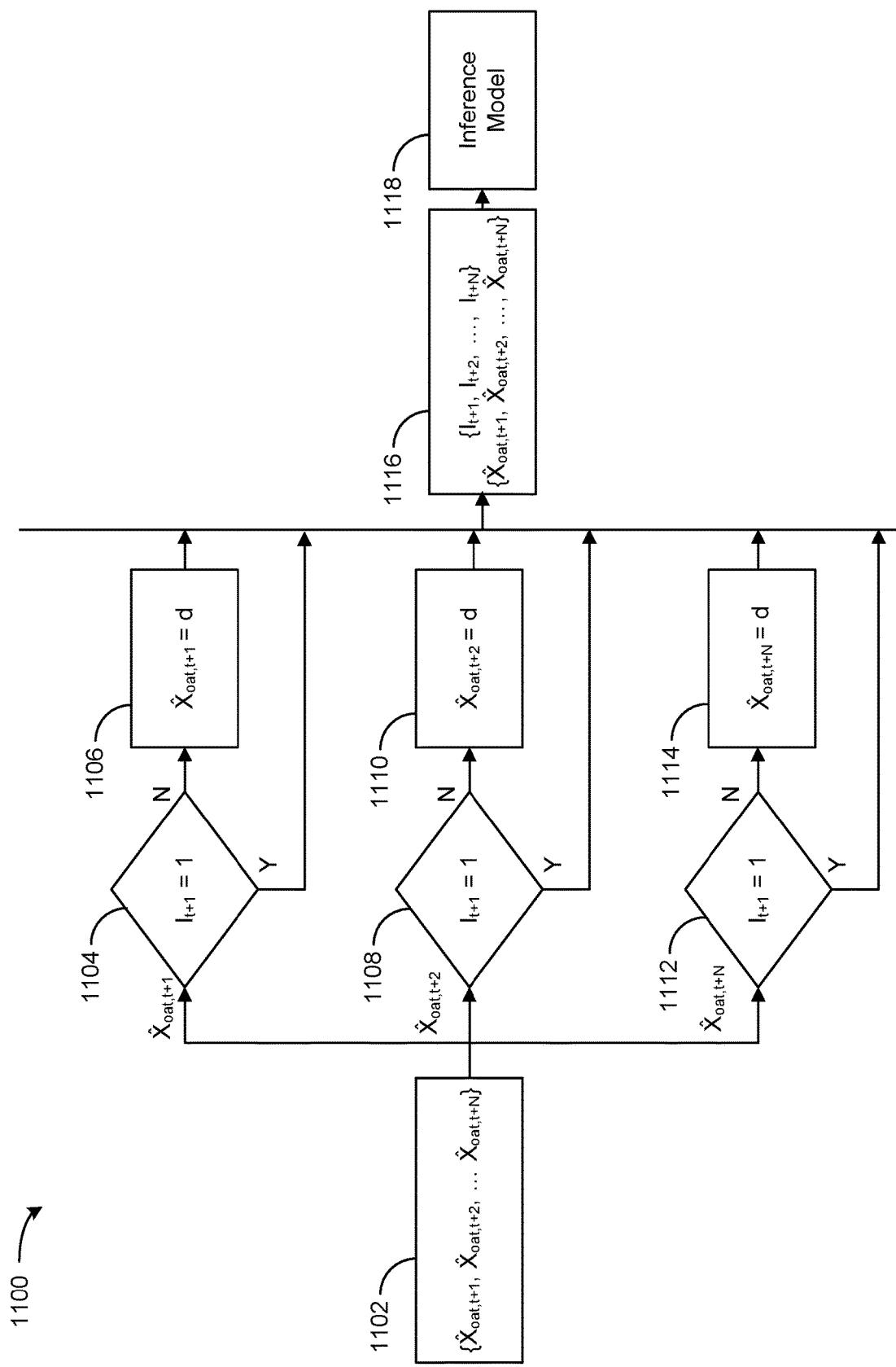
FIG. 11 is a flow diagram of a process for generating an input vector to input into an inference model for energy forecasting, according to an exemplary embodiment.

Referring now to FIG. 11, a flow diagram of a process 1100 for generating an input vector to input into a prediction model for energy forecasting is shown, according to an exemplary embodiment. The input vector may be a feature vector that includes forecast values and/or predetermined values associated with various time-steps. Process 1000 may be performed by forecast selection system 902 or any other data processing system. Process 1100 may include any number of steps and the steps may be performed in any order. In some embodiments, forecast selection system 902 performs process 1100 following process 1000. At a step 1102, forecast selection system 902 may receive a forecast data set from a data source provider indicating forecast values of data points of a building system at various time-steps. As described above, the forecast values may be associated with any data point of a building. The forecast data set may be of the form:

$$\{\hat{X}_{oat,t+1}, \hat{X}_{oat,t+2}, \ldots, \hat{X}_{oat,t+N}\}$$

$\hat{X}$ may indicate a forecast value. Oat may indicate an outside air temperature. t+N may indicate a time, N, into the future from when the forecast was made (e.g., at a time-step N in the future).

At steps 1104, 1108, and 1112, forecast selection system 902 may determine whether each time-step associated with the forecast data set is associated with inaccurate data. Forecast selection system 902 may do so by identifying a value of an indicator associated with the accuracy of the data at each time-step. If the indicator indicates that the time-step is associated with inaccurate data (e.g., $I_{oat,t+N}=0$), at steps 1106, 1110, or 1114, forecast selection system 902 may replace the value associated with the time-step associated with the inaccurate data with a predetermined value, d. The predetermined value may be any value (e.g., zero). However, if forecast selection system 902 determines at step 1106, 1110, or 1114, that the associated time-step is associated with accurate data (e.g., $I_{oat,t+N}=1$), forecast selection system 902 may keep the predicted value of the forecast data set. In this way, forecast selection system 902 may generate an updated prediction data set that includes forecast values for time-steps that forecast selection system 902 has determined are associated with accurate data and predetermined values for time-steps that forecast selection system 902 has determined are associated with inaccurate data. Consequently, forecast selection system 902 may generate an updated prediction data set that includes accurate data to input into a prediction model (e.g., inference model 926) of forecast selection system 902.

At a step 1116, forecast selection system 902 may aggregate the updated prediction data set with a vector that indicates the index values of the updated prediction data set that are associated with a predetermined value and the index values of the updated prediction data set that are not associated with a predetermined value. The vector may take the form reproduced below:

$$\{I_{oat,t+1}, I_{oat,t+2}, \ldots, I_{oat,t+N}\}$$

The vector may include binary values indicating if corresponding index values (e.g., values at the same time-step) of the updated prediction data set have been replaced with predetermined values. For example, $I_{oat,t+1}$ may equal zero if $\hat{X}_{oat,t+1}$ has been replaced with a predetermined value. The vector may be of equal length to the updated prediction data set so the prediction model of forecast selection system 902 may receive data identifying which index values of the updated prediction data set are associated with predetermined values and which index values are not. In some cases, the indicators may be individually associated with the point of the building system. The indicators may be individually associated with multiple points. At a step 1118, forecast selection system 902 may supply the vector and the updated prediction data set to the prediction model of forecast selection system 902.

Figure 12:
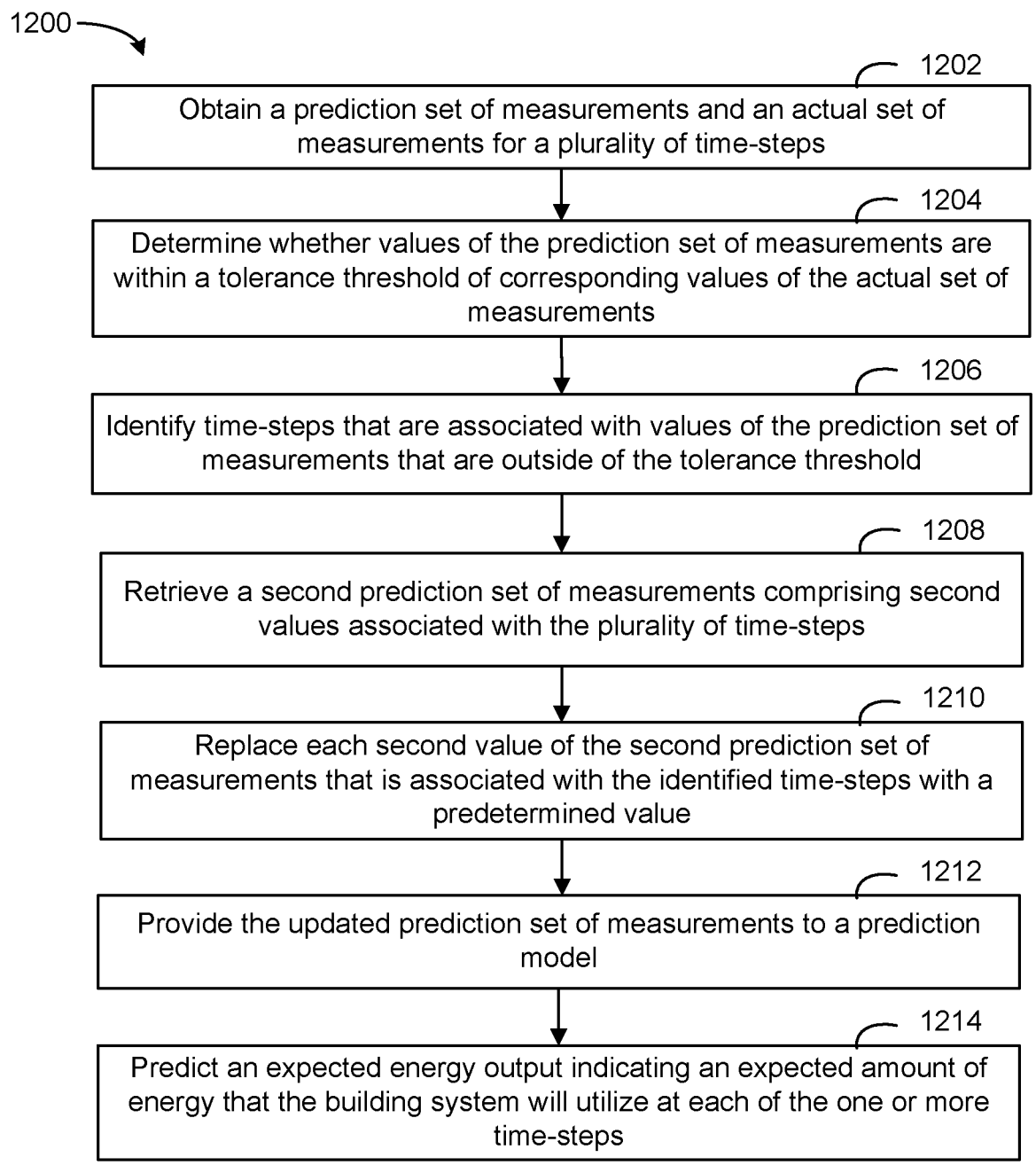
FIG. 12 is a flow diagram of a process for selecting forecasts to provide to a prediction model for energy forecasting, according to an exemplary embodiment.

Referring now to FIG. 12, a flow diagram of a process 1200 for selecting forecasts to provide to a prediction model for energy forecasting is shown, according to an exemplary embodiment. Process 1200 may be performed by forecast selection system 902 or any other data processing system. Process 1200 may include any number of steps and the steps may be performed in any order. In some embodiments, process 1200 may be performed in addition to process 1400. At a step 1202, forecast selection system 902 may obtain a prediction set of measurements and an actual set of measurements for a plurality of time-steps. The prediction set of measurements may be associated with a data source provider that is internal or external to a building system. The prediction set of measurements may include values at various time-steps and be associated with a data point of the building system. The actual set of measurements may include values at corresponding time-steps. The prediction set of measurements (e.g., the historical prediction set of measurements) may include previous predictions that the data source provider made as to future values of the data point at the various time-steps. The actual set of measurements (e.g., the historical actual set of measurements) may include the actual values of the data point at the same time-steps.

At a step 1204, forecast selection system 902 may determine whether values of the prediction set of measurements are within a tolerance threshold of corresponding values of the actual set of measurements. Forecast selection system 902 may determine a difference between values of the prediction set of measurements and the actual set of measurements at various time-steps, a CV-RMSE value at each of the time-steps, and/or a CUSUM value at each of the time-steps. Forecast selection system 902 may compare any of the difference, the CV-RMSE value, or the CUSUM value of any of the various time-steps to a tolerance threshold. The tolerance threshold may be specific to each time-step and/or the type of value. At a step 1206, forecast selection system 902 may identify any time-steps that are associated with values of the prediction set of measurements that are outside of the tolerance threshold based on the comparison. Forecast selection system 902 may identify the time-steps that are associated with a difference, a CV-RMSE value, or a CUSUM value that exceeds an associated threshold as being outside of the tolerance threshold. In some embodiments, forecast selection system 902 may generate an alert for each time-step that is associated with a difference, a CV-RMSE value, or a CUSUM value that exceeds the tolerance threshold.

At a step 1208, forecast selection system 902 may retrieve a second prediction set of measurements comprising second values associated with the plurality of time-steps. The second prediction set of measurements may include predictions for second values of a data point at various time-steps. Forecast selection system 902 may retrieve the predictions from the same data source provider that provided the previous prediction set of measurements. The second prediction set of measurements may be associated with the same data point of the building system.

At a step 1210, forecast selection system 902 may replace each second value of the second prediction set of measurements that is associated with the identified time-steps with a predetermined value to generate an updated prediction set of measurements. The predetermined value may be a dummy value indicating for a prediction model of forecast selection system 902 to ignore any data associated with time-steps associated with the predetermined value. For example, when implemented as an input into a neural network, the predetermined value may be a zero. Predetermined values associated with any time-steps that are input to the neural network may not have any weight because they are only multiplied by zero between the input, hidden, and output layers of the neural network. The predetermined value may be any value, however. At a step 1212, forecast selection system 902 may provide the updated prediction set of measurements to a prediction model.

At a step 1214, forecast selection system 902 may predict, using the prediction model and based on the updated prediction set, for one or more time-steps into the future, an expected energy output indicating an expected amount of energy that the building system will utilize at each of the one or more time-steps. Forecast selection system 902 may generate a probability distribution including probabilities for various energy values at time-steps in the future. In some embodiments, forecast selection system 902 may generate a probability for a specific value at each time-step. Forecast selection system 902 may make the prediction and send the prediction to a controller to control building equipment of the building system or to a client device for display.

Advantageously, by selectively using energy forecasts in training and in generating prediction data sets, forecast selection system 902 may more accurately predict how much energy a building system will utilize at various time-steps. By implementing the systems and methods described herein, forecast selection system 902 may identify time-steps for which an external or internal data source provider may provide inaccurate data and ensure that future data associated with the identified time-steps that forecast selection system 902 receives from the same data source provider is not used to predict how much energy the building system will use at the identified future time-steps. Forecast selection system 902 may provide the data to a prediction model to obtain a prediction indicating various likelihoods for how much energy the building system will use at various time-steps in the future.

Referring now to FIG. 13, an augmented training data set 1300 that can be used to generate a prediction model for energy forecasting is shown, according to an exemplary embodiment. Augmented training data set 1300 may be used to train a prediction model of forecast selection system 902 to use prediction data values related to outside air temperature that has, at least partially, been replaced with predetermined values to account for inaccurate data at various time-steps. Augmented training data set 1300 is shown to include three unique training data sets, $X_i^0$, $X_i^1$, $X_i^2$, and $X_i^3$. The $X_i^0$ training data set may include realized data values associated with non-outside air temperature points, predicted values for the outside air temperature at various time-steps, an indicator training data set that indicates that each predicted value is being used for training, and realized expected energy values.

The $X_i^1$ training data set may include the same components as the $X_i^0$ training data set. However, the value for the last time-step of the predicted values for the outside air temperature may be replaced by a predetermined value (e.g., a dummy value). Further, the value of the last index value (e.g., the value associated with the last time-step of the training data) of the indicator training data set may be replaced with a 0. The $X_i^2$ training data set may include the same components as the $X_i^1$ training data set. However, the second to last prediction value for the outside air temperature may be replaced by the predetermined value and, consequently, the second to last value of the indicator training data set may be replaced with a zero. For further training data sets of the augmented training data set, predicted values for the outside air temperature may progressively be replaced with predetermined values at time-steps starting at the third to last time-step until a training data set is generated with each prediction value being replaced with the predetermined value. For example, the $X_i^3$ training data set may be the last training data set of the augmented training data set. The $X_i^3$ training data set may include the same components as the $X_i^2$ training data set. However, each predicted value for the outside air temperature may be replaced by the predetermined value and each value of the indicator training data set may be replaced with a zero.

Figure 14:
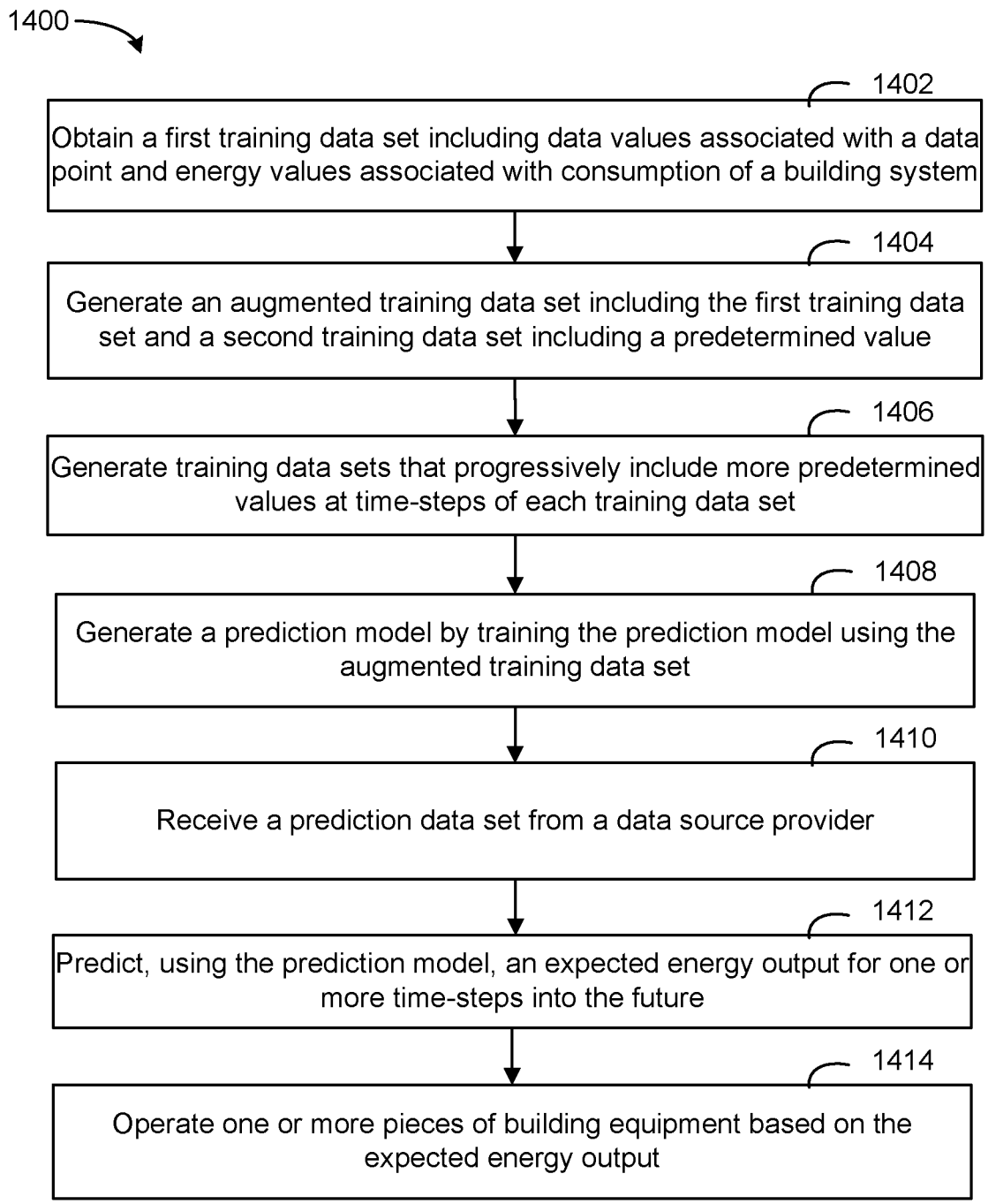
FIG. 14 is a flow diagram of a process for generating an augmented training data set and generating a prediction model for energy forecasting with the augmented training data set, according to an exemplary embodiment.

Referring now to FIG. 14, a flow diagram of a process 1400 for generating an augmented training data set and generating a prediction model for energy forecasting using the augmented training data set is shown, according to an exemplary embodiment. Process 1400 may be performed by forecast selection system 902 or any other data processing system. Process 1400 may include any number of steps and the steps may be performed in any order. In some embodiments, process 1400 may be performed in addition to process 1200. Process 1400 may be implemented to forecast values associated with any data point of a building system.

At a step 1402, forecast selection system 902 may obtain a first training data set including data values associated with a data point and energy values associated with consumption of a building system, in some embodiments. The data point may be a point of the building system such as, but not limited to, outside air temperature, plug load schedule, light load schedule, occupancy, and scheduling temperature. The data values may be forecast values that were provided by an external or internal data source provider. The forecast values may be predicted values of the data point at various time-steps. For example, an external weather service may predict the temperature at each hour in a 24-hour time period for a location or region that is close to the building system. The predicted air temperature at each hour may be a data value associated with the data point. Each hour may be a time-step. Time-steps may be at any interval. The energy values may be realized energy values associated with an amount of energy that the building system has consumed between time-steps.

In some embodiments, the training data may also include realized values of other data points at each time-step. For example, a training data set may include predicted values for the outside air temperature at various time-steps, realized energy values at each time-step, and realized occupancy values at each time-step. The realized values of other data points and the predicted data values may each be associated with any data point.

At a step 1404, forecast selection system 902 may generate an augmented training data set including the first training data set and a second training data set including a predetermined value, in some embodiments. The second training data set may include the same energy values as the first training data set and the same data values of the first training data set. However, for the second training data set, forecast selection system 902 may replace one of the data values with a predetermined value (e.g., a dummy value). As described herein, the predetermined value may be a value that indicates, to a prediction model, that data associated with a time-step of the predetermined value is inaccurate and should not be considered when the prediction model determines probabilities for data values at various time-steps. Forecast selection system 902 may replace the data value associated with the last time-step of the training data with the predetermined value. Forecast selection system 902 may keep any values associated with the realized values of another data point and the energy values the same from the first training data set in the second training data set.

In some embodiments, forecast selection system 902 may generate indicator training data sets that individually correspond to the first and the second training data sets. The indicator training data sets may include binary values (e.g., 1 or 0) at each index value of the training data set. The index values may correspond to time-steps of the first and second training data sets. In the indicator training data sets, forecast selection system 902 may cause values at index values associated with time-steps associated predetermined values to be zero and values at index values associated with time-steps associated with data values to be ones. Forecast selection system 902 may generate an indicator training data set for each training data set and include the generated indicator training data sets in the augmented training data set.

At a step 1406, forecast selection system 902 may generate training data sets that progressively include more predetermined values at time-steps of each training data set, in some embodiments. Forecast selection system 902 may include each of the training data sets in the augmented training data. For example, forecast selection system 902 may generate a third training data set that includes the same realized energy values and data values as the second training data set. However, forecast selection system 902 may replace the data value of the second to last time-step with the predetermined value. Consequently, the data values associated with the last two time-steps of the third training data set may be associated with predetermined values. In some embodiments, forecast selection system 902 may generate a new indicator training data set that corresponds to the third training data set and include the third training data set and the new indicator training data set in the augmented training data set. Forecast selection system 902 may similarly generate training data sets and, in some embodiments, corresponding indicator training data sets by gradually replacing the last non-predetermined data value with a predetermined value at each training data set until forecast selection system 902 generates a training data set where each data value has been replaced with the predetermined value. Forecast selection system 902 may include each training data set in the augmented training data set.

At a step 1408, forecast selection system 902 may generate a prediction model by training the prediction model using the augmented training data set, in some embodiments. Forecast selection system 902 may train the prediction model by inputting augmented training data into the prediction model. In some embodiments, forecast selection system 902 may input training data before it is augmented in addition to the augmented training data into the prediction model. Forecast selection system 902 may input the training data and/or augmented training data into the prediction model and receive an output from the prediction model indicating probabilities for expected energy outputs of the building system at various time-steps. Forecast selection system 902 may compare the expected energy outputs to the energy outputs of the training data to determine how accurate the prediction model is. Forecast selection system 902 may compare the accuracy to a threshold (e.g., 80%). If the accuracy is above the threshold, forecast selection system 902 may generate the prediction model and use it to predict energy outputs using live data (e.g., data point forecasts from external or internal data source providers to determine future expected energy outputs). However, if the accuracy is below the threshold, forecast selection system 902 may continue training the prediction model with training data and augmented training data until the prediction model is accurate above the threshold.

At a step 1410, forecast selection system 902 may receive a prediction data set from a data source provider. The prediction data set may include prediction data values associated with a point of the building system. In some cases, the prediction data values may be associated with the same data point that forecast selection system 902 used to train the prediction model. Each prediction data value may be associated with a time-step. For example, the prediction data set may include a prediction that the outside air temperature will be 65 (e.g., 65 degrees) one hour into the future, 70 two hours into the future, 68 three hours into the future, and 69 four hours into the future. Each hour may be representative of a time-step. Forecast selection system 902 may receive the prediction data set and input it into the prediction model.

In some embodiments, forecast selection system 902 may retrieve realized energy values (e.g., current energy values) at time-steps associated with the prediction data set (e.g., the current prediction data set) and use the prediction data set and the and the realized energy values associated with the prediction data to train the prediction model. Forecast selection system 902 may generate an augmented training data set using the prediction data set and the realized energy values as described above. Forecast selection system 902 may then input the augmented training data set into the prediction model. In this way, forecast selection system 902 may constantly and dynamically be trained (e.g., trained to handle changes in the data as time goes on) to handle predetermined values in prediction data sets and generate accurate data.

At a step 1412, forecast selection system 902 may predict, using the prediction model, an expected energy output for one or more time-steps into the future, in some embodiments. The prediction model may receive the prediction data set and predict an expected energy output. The expected energy output may indicate an expected amount of energy that the building system may utilize a multiple time-steps. The expected energy output may include probabilities for various expected amounts of energy or a probability for an amount of energy at each time-step. Forecast selection system 902 may transmit the expected energy output to a controller to control building equipment or to a client device to be displayed at a user interface.

At a step 1414, forecast selection system 902 may operate one or more pieces of building equipment based on the expected energy output. If forecast selection system 902 transmits the expected energy output to a controller, the controller may receive and process the expected energy output. The controller may identify how much energy various building equipment configurations may utilize and may, in some cases, adjust the equipment based on the expected energy output.

Advantageously, by generating augmented data sets and using the augmented data sets to generate a prediction model, a prediction model can be created that can account for data including predetermined values that are not meant to be considered in determining expected energy outputs at various time-steps. Consequently, fewer learning models (e.g., one) may be needed when receiving prediction data from various data source providers and predicting future values of a data point. Further, fewer training data sets are needed to train the prediction model because multiple training data sets can be generated based off of a single training data set. Thus, the systems and methods described herein may be used in a new building system to quickly be trained to generate prediction data for various data points and time-steps based on forecasts having varying amounts of accuracy.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building system for generating input forecast data, the building system comprising one or more memory devices configured to store instructions thereon that, when executed by one or more processors, cause the one or more processors to:

retrieve a current prediction set of measurements comprising current values associated with a plurality of time-steps;

identify time-steps of the plurality of time-steps for which historical prediction values of a historical prediction set of measurements are outside of a tolerance of corresponding historical actual values of a historical actual set of measurements;

replace each current value of the current prediction set of measurements that is associated with the identified time-steps with a predetermined value to generate an updated prediction set of measurements; and provide the updated prediction set of measurements to a prediction model.

2. The building system of claim 1, wherein the instructions cause the one or more processors to:
predict, using the prediction model and based on the updated prediction set, for one or more time-steps into the future, an expected energy output indicating an expected amount of energy that the building system will utilize at each of the one or more time-steps.

3. The building system of claim 2, wherein the instructions cause the one or more processors to perform at least one of:
operate one or more pieces of building equipment based on the expected energy output; or
generate one or more user interfaces including interface elements, the interface elements based on the expected energy output.

4. The building system of claim 1, wherein the instructions cause the one or more processors to identify time-steps of the plurality of time-steps by:
obtaining the historical prediction set of measurements and the historical actual set of measurements for the plurality of time-steps, each of the plurality of time-steps associated with a historical prediction value of the historical prediction set of measurements and a historical value of the historical actual set of measurements;
determining whether the historical prediction values of the historical prediction set of measurements are within a tolerance threshold of corresponding historical values of the historical actual set of measurements; and
identifying time-steps that are associated with historical values of the historical prediction set of measurements that are outside of the tolerance threshold.

5. The building system of claim 4, wherein the instructions cause the one or more processors to determine whether values of the historical prediction set of measurements are within a tolerance threshold by:
determining, for each of the plurality of time-steps, a coefficient of variation of a root-mean-square error (CV-RMSE) value based on the historical prediction values of the historical prediction set of measurements and the historical actual values of the historical actual set of measurements; and
comparing the CV-RMSE values of each time-step to the tolerance threshold.

6. The building system of claim 5, wherein the tolerance threshold is unique to each time-step.

7. The building system of claim 4, wherein the instructions cause the one or more processors to determine whether historical values of the historical prediction set of measurements are within a tolerance threshold by:
determining, for each of the plurality of time-steps, a CV-RMSE value based on the historical values of the historical prediction set of measurements and the historical values of the historical actual set of measurements;
determining, for each of the plurality of time-steps, a cumulative sum (CUSUM) value based on the CV-RMSE value of the time-step; and
comparing the CUSUM value of each time-step to the tolerance threshold.

8. The building system of claim 1, wherein the instructions cause the one or more processors to identify time-steps of the plurality of time-steps by:
receiving an indication of the time-steps from an external system: and identifying time-steps from the indication.

9. The building system of claim 1, wherein the predetermined value is a dummy value indicating for the prediction model to ignore any prediction data associated with a time-step associated with the predetermined value.

10. The building system of claim 1, wherein the instructions cause the one or more processors to:
generate input data that indicates index values of the updated prediction set of measurements that are associated with the predetermined value; and
provide the input data to the predictive model.

11. A method for generating input forecast data, the method comprising:
obtaining, by a processing circuit, a historical prediction set of measurements and a historical actual set of measurements for a plurality of time-steps, each of the plurality of time-steps associated with a historical value of the historical prediction set of measurements and a historical value of the historical actual set of measurements;
determining, by the processing circuit, whether historical values of the historical prediction set of measurements are within a tolerance threshold of corresponding historical values of the historical actual set of measurements;
identifying, by the processing circuit, time-steps that are associated with historical values of the historical prediction set of measurements that are outside of the tolerance threshold;
retrieving, by the processing circuit, a current prediction set of measurements comprising current values associated with the plurality of time-steps;
replacing, by the processing circuit, each current value of the current prediction set of measurements that is associated with the identified time-steps with a predetermined value to generate an updated prediction set of measurements; and
providing, by the processing circuit, the updated prediction set of measurements to a prediction model.

12. The method of claim 11, comprising:
predicting, by the processing circuit using the prediction model and based on the updated prediction set, for one or more time-steps into the future, an expected energy output indicating an expected amount of energy that the building system will utilize at each of the one or more time-steps.

13. The method of claim 12, comprising:
operating, by the processing circuit, one or more pieces of building equipment based on the expected energy output; or
generating, by the processing circuit, one or more user interfaces including interface elements, the interface elements based on the expected energy output.

14. The method of claim 11, wherein the historical prediction set of measurements comprises historical values associated with outside air temperature, energy load, occupancy, or scheduling information.

15. The method of claim 11, wherein determining whether historical values of the historical prediction set of measurements are within a tolerance threshold comprises:
determining, by the processing circuit, for each of the plurality of time-steps, a coefficient of variation of a root-mean-square error (CV-RMSE) value based on the historical values of the historical prediction set of measurements and the historical values of the historical actual set of measurements; and
comparing, by the processing circuit, the CV-RMSE values of each time-step to the tolerance threshold.

16. The method of claim 15, wherein the tolerance threshold is unique to each time-step.

17. The method of claim 11, wherein determining whether historical values of the historical prediction set of measurements are within a tolerance threshold comprises:
- determining, by the processing circuit, for each of the plurality of time-steps, a CV-RMSE value based on the historical values of the historical prediction set of measurements and the historical values of the historical actual set of measurements;
- determining, by the processing circuit, for each of the plurality of time-steps, a cumulative sum (CUSUM) value based on the CV-RMSE value of the time-step; and
- comparing, by the processing circuit, the CUSUM value of each time-step to the tolerance threshold.

18. The method of claim 17, comprising:
- generating, by the processing circuit, an alert for each time-step that is associated with a CUSUM value that exceeds the tolerance threshold.

19. The method of claim 11, wherein the predetermined value is a dummy value indicating for the prediction model to ignore any prediction data associated with a time-step associated with the predetermined value.

20. A non-transitory computer-readable storage medium having instructions stored thereon that, upon execution by a processor, cause the processor to perform operations to generate forecast input data, the operations comprising:
- obtaining a historical prediction set of measurements and a historical actual set of measurements for a plurality of time-steps, each of the plurality of time-steps associated with a historical value of the historical prediction set of measurements and a historical value of the historical actual set of measurements;
- determining whether historical values of the historical prediction set of measurements are within a tolerance threshold of corresponding historical values of the historical actual set of measurements;
- identifying time-steps that are associated with historical values of the historical prediction set of measurements that are outside of the tolerance threshold;
- retrieving a current prediction set of measurements comprising current values associated with the plurality of time-steps;
- replacing each current value of the current prediction set of measurements that is associated with the identified time-steps with a predetermined value to generate an updated prediction set of measurements; and
- providing the updated prediction set of measurements to a prediction model.

* * * * *